(12) United States Patent
Fishback et al.

(10) Patent No.: US 8,680,168 B2
(45) Date of Patent: Mar. 25, 2014

(54) METHOD FOR FILLING WALL CAVITIES WITH EXPANDING FOAM INSULATION

(75) Inventors: Tom Fishback, Cuyahoga Falls, OH (US); Doug Caffoe, Aurora, OH (US); Anthony Taylor, Medina, OH (US); Julie L. Shoemaker, Akron, OH (US)

(73) Assignee: Fomo Products, Inc., Norton, OH (US)

( * ) Notice: Subject to any disclaimer, the term of this patent is extended or adjusted under 35 U.S.C. 154(b) by 0 days.

(21) Appl. No.: 13/298,751

(22) Filed: Nov. 17, 2011

(65) Prior Publication Data

US 2012/0121805 A1    May 17, 2012

Related U.S. Application Data

(60) Provisional application No. 61/572,277, filed on Nov. 17, 2010, provisional application No. 61/535,162, filed on Sep. 15, 2011.

(51) Int. Cl.
*C08G 18/00* (2006.01)
*C08G 18/22* (2006.01)
*B05D 7/22* (2006.01)

(52) U.S. Cl.
USPC ............ 521/56; 521/82; 521/98; 521/131; 427/230; 427/243

(58) Field of Classification Search
USPC ........ 427/230–239, 243–247; 156/56, 82, 98, 156/131
See application file for complete search history.

(56) References Cited

U.S. PATENT DOCUMENTS

| | | | |
|---|---|---|---|
| 4,417,998 | A | 11/1983 | Kennedy |
| 4,425,446 | A | 1/1984 | Malwitz et al. |
| 4,430,840 | A | 2/1984 | Malwitz |
| 6,506,810 | B2 | 1/2003 | Borgogelli et al. |
| 7,717,357 | B2 | 5/2010 | Gantenbein et al. |
| 2006/0069175 | A1* | 3/2006 | Barber et al. ............. 521/155 |
| 2009/0030099 | A1* | 1/2009 | Chino et al. ............. 521/139 |
| 2009/0082478 | A1* | 3/2009 | Lund et al. ............. 521/131 |
| 2010/0016457 | A1 | 1/2010 | Bowman et al. |
| 2010/0056657 | A1 | 3/2010 | Chen et al. |
| 2010/0076100 | A1 | 3/2010 | Chen |
| 2010/0087557 | A1 | 4/2010 | Chen et al. |
| 2010/0113629 | A1 | 5/2010 | Van Horn et al. |
| 2010/0174008 | A1 | 7/2010 | Enaux et al. |
| 2010/0181524 | A1 | 7/2010 | Elsheikh et al. |
| 2010/0222443 | A1 | 9/2010 | Enaux et al. |
| 2011/0155942 | A1 | 6/2011 | Pigamo et al. |
| 2011/0218369 | A1 | 9/2011 | Elsheikh et al. |

OTHER PUBLICATIONS

Product specification sheet for ICYNENE LD-C-50—USA, SL-200-5, Oct. 2010.
John Bartlo, Article printed from energsmart.com titled: Open vs. Closed Cell Foam; Energsmart Foam Insulation, Copyrighted 2009, printed Nov. 10, 2010.
A. Hunter Fanney and R.R Zarr of the National Institute of Standards and Technology, and SRIRAM SOMASUNDARAM and Scott L Freeman of the Pacific Northwest National Laboratory; Performance Testing of Alternative Blowing Agents for Foam Insulation of Residential Water Heaters; Proceedings of the Appliance Manufacturer Conference and Exposition (AMCE) Sep. 27-29, 1999, Nashville, TN., pp. 293-303.
John McMenamin, Mark L. Robin, PhD., Gary Loh and Joseph A. Creazzo; presentation titled Development of Novel Blowing Agents for Polyurethane Foams; Du Pont, presented at UTECH Europe 2009, Maastricht, Netherlands, Mar. 31-Apr. 2, 2009.
Presentation titled: Phaseout Technologies for Pu Foams, no author listed, United Nations Development Programme, HCFC Phaseout Program, Jun. 2010, 19 pgs.
Richard Babyak; Insulation Alternative Blowing Agents; Appliance Design, Mar. 2009, pp. 34-35 & 38.
Richard Babyak; printout from website appliancedesign.com, titled Insulation: Alternative Blowing Agents; Appliance Design, Mar. 1, 2009; printed on Nov. 10, 2010.
Gary Loh, Joseph A. Creazzo, Mark L. Robin; Development Program Update for Low GWP Foam Expansion Agent, DuPont Fluorochemicals, Nov. 2009, 10 pgs.
Lilli Manolis Sherman, Internet printout from thefreelibrary.com titled Global Warming: New Challenge for Polyurethanes?, copyrighted 2009, printed Nov. 10, 2010.
Honeywell Safety Data Sheet, HFO-1234ze, HBA-1, no author listed, Version 1.6, Revision date Aug. 13, 2008, Print date Sep. 15, 2008, 7 pgs.
J. Costa, Arkema Canadian Foam Seminar—Forane 365mfc/227ea, Nov. 3, 2011.
Cesare Soffientini et al., HFC-245fa: An Overview of Properties and Applications, date unknown.
Ben Chen et al., Investigation of Low GWP Blowing Agents, ApplianceMagazine.com, printed Oct. 27, 2011.
G.J. Zyhowski, An Overview of the Properties and Applications of HFc-245fa, International Refrigeration and Air Conditioning Conference at Purdue University, 2002.
Zhejiang Lantian Environmental Protection Chemical Co., Ltd. ,1,1,1,3,3-Pentafluoropropane (Pentafluoropropane) HFC-245fa property sheet, copyright 2007.
Dr. Manfred Knapps et al., The Production of Rigid Polyurethane Foam. Bayer Material Science, Jun. 29, 2004.
List of Refrigerants—Wikipedia, the free encyclopedia, printed Oct. 28, 2011.
PHT4-DIOL LV, Reactive Halogenated Flame Retardant. Technical Information, Great Lakes Solutions, Dec. 1, 2010.
Gary Loh et al., Further Development of a Low GWP Foam Expansion Agent with Improved Insulation Performance vs. Commercially Available Options Today. Blowing Agents & Foaming Processes, Cologne, Germany, 2010.
Alternative Blowing Agent Options for HCFC 141b. Indian Polyurethane Association, Foam Sector, Jun. 2010.
Methyl Formate: Being Kind to the Planet, Industrial Urethanes, printed on Oct. 27, 2011.
Investigation of new low GWP blowing agent AFA-L1 for PU/PIR. website: goliath.ecnext/com, printed Oct. 27, 2011.
Larry Adams, Cooling Technologies, Appliance Design, printed Oct. 27, 2011.
James M. Bowman et al., HBA-1 Blowing Agents Commercialization Status, Honeywell International, no date listed.

(Continued)

*Primary Examiner* — William Phillip Fletcher, III
(74) *Attorney, Agent, or Firm* — Hahn Loeser & Parks LLP

(57) ABSTRACT

The invention is the use of low boiling point, low vapor pressure blowing agents with froth polyurethane or polyisocyanurate foams to fill cavity voids when compared to higher vapor pressure or more ozone-depleting blowing agents.

33 Claims, 13 Drawing Sheets

(56) References Cited

OTHER PUBLICATIONS

David Snider et al., Assessment of HBA-2 Blowing Agent as Replacement of HFCs in Rigid Polyurethane Insulating Foams for the Cold Chain Industry. Dow Chemical, no date listed.

Jim Y.K. Ling et al., Evaluation of HBA-2, a Low GWP Blowing Agent, in Pour-in-Place Applications. Honeywell International, no date listed.

Ryan Hulse et al., Predictive Model for Polyurethane Blowing Agent Emissions into a House. Honeywell Blowing Agents & Foaming Processes 2011.

TEGOSTAB B 8250 product sheet. degussa, no date listed.

Natural Foam Blowing Agents, Sustainable Ozone—and Climate-Friendly Alternatives to HCFCs. GTZ Proklima—a programme to save the ozone layer, Aug. 2009. (pages cover thru 100).

Natural Foam Blowing Agents, Sustainable Ozone—and Climate-Friendly Alternatives to HCFCs. GTZ Proklima—a programme to save the ozone layer, Aug. 2009. (pp. 101-178).

Ana Mafalda Felix Brihante, Re-Formulation and Cost Optimisation of One Component PU Foams. Instituto Surperior Tecnico, Oct. 2008.

International Search Report for PCT/US11/61153.

Written Opinion of International Search Authority for PCT/US11/61153.

* cited by examiner

METHOD FOR FILLING WALL CAVITIES WITH EXPANDING FOAM INSULATION

TECHNICAL FIELD

The invention described herein pertains generally to a method for employing polymeric foams, particularly in retrofit applications to either supplement existing insulation or to add insulation to exterior walls in the first instance and associated compositions thereof.

BACKGROUND OF THE INVENTION

In today's energy conservation conscious world, finding ways to better insulate our homes, is foremost on the minds of a great many people. Many different materials have been used for such insulation. For example, fiberglass insulation provides good insulation characteristics for insulation of walls, ceilings, etc. of homes. However, a large number of homes have been built in the past without sufficient insulation in their walls. Obviously, it would be very costly remove and replace the walls of a home to retrofit them with insulation materials such as fiberglass. Accordingly, methods which would avoid such destruction of the walls are extremely advantageous.

One of the road blocks to achieving maximum energy efficiency in residential home weatherization retrofits is the type of construction encountered in homes built prior to and during the 1970's. "Balloon" construction was common in residential construction and the exterior walls of the house are not filled with insulation, they are hollow. In some instances, the wall cavities were open to the attic on the top, and the basement below. Since attics and basements are full of damp cold air, convective air current laden with this cold, moist air circulated within the walls.

The United States has placed an increased emphasis on the energy efficiency of residential and commercial buildings and provided stimulus money for these weatherization programs. It is believed that approximately 40% of a building's energy costs are related to heating and cooling losses attributable to air movement in and out of the structure. Therefore, stopping air movement in this manner has one of the largest impact on reducing energy costs relating to heating and cooling, offering even more value than replacing windows and installing new HVAC equipment. Foam insulation and sealants, combined with other structural materials such as oriented strand board ("OSB") and drywall, all combine to create the building's air barrier. A continuous air barrier is required for maximum energy conservation.

Various foam materials have been used in the past in an attempt to retrofit wall cavities with insulation materials. For example, ureaformaldehyde and phenolformaldehyde foams have been previously used by pumping such foam into the wall cavity through a hole placed in the walls. Ureaformaldehyde foam has a number of disadvantages including friability, release of toxic formaldehyde if poorly applied, shrinkage with subsequent loss of insulation effectiveness, and limited warm temperature resistance that prohibits its use in walls in warmer climates and in attics. The major drawback of loose-fill insulation products is settling with time, creating uninsulated voids in wall cavities. Impracticality prohibits the use of more conventional insulation materials (such as, urethane board stock, fiberglass, polystyene, foamed glass, polyolefin foams) to retrofit wall sections simply because of the difficulty of manufacturing and/or installing at the site without extensive building damage.

Polyurethane and polyisocyanurate foams are well-known as effective insulation materials. However, using such prior polyurethane or polyisocyanurate foams to retrofit wall cavities with insulation has met with certain difficulties. First, the polyurethane or polyisocyanurate insulating foams have been too dense to make them economical as insulation for wall cavities. For example, most walls contain cavities in the range of three and five-eighths inches (equivalently 9.21 cm) thick. The amount of polyurethane or polyisocyanurate foam needed to fill these large cavities cannot be economically justified in terms of the insulation obtained by the foam, e.g., satisfactory insulation characteristics would be economically obtained with a foam about 2 inches (equivalently 5.1 cm) thick. Moreover, the prior polyurethane or polyisocyanurate foams used to retrofit wall cavities with insulation have had other problems because they have rise times which greatly exceed their gel or set times. Thus, such a foam first sets within the wall cavity to such an extent that the pressure generated within the cavity causes damage as the foam completes its expansion. Also, excess foam inadvertently admitted into the wall cavity will not continue to extrude through the access hole in the wall, but rather will continue to expand creating internal pressure pushing on the walls of the cavity and in many instances causing buckling or even cracking of the walls.

At least one entity is believed to offer a slow-reacting, low density, open-celled polyurethane foam which is dispensed using high pressure impingement-mixing equipment. As with any high pressure dispensing equipment, the foam is initially dispensed as a liquid, turning to a froth after a period of time. While a liquid, it seeps out through penetrations in the floor boards at the bottom of the wall cavity, damaging flooring surfaces. Once it begins to expand (at approximately at least 20 seconds after application), the expansion is believed to be vigorous, leading to drywall damages. The foam is blown with water through the reaction of water and MDI forming carbon dioxide. This foam is believed to be applied carefully, using many holes in the wall cavity, and requiring that the baseboard area be taped off to prevent seepage of the dispensed foam.

It is also believed that acrylic-based latex type foams have been tried with limited success in that the acrylic-based latex type form has little or no apparent structural integrity, as it is not crosslinked, leading to slumping and degradation within the wall cavities in a relatively short amount of time after installation.

Therefore, it is easily seen that what is needed is a way to dispense foam into cavities in which there is minimal to no damage to existing drywall and further which flows around obstructions (e.g., electrical boxes) within the wall cavity, employs a foam with structural integrity, preferably crosslinked, thereby forming a continuous air barrier in the exterior walls of the structure.

SUMMARY OF THE INVENTION

In accordance with the present invention, there is provided a frothable foam which upon expansion, does not damage drywall and flows around significant obstructions, preferably with only employing one drill hole per cavity, recognizing that certain applications with unique geometries and/or obstructions may require additional holes.

It is yet another aspect of the invention to provide a foam of reasonably uniform density within the cavity, from top to bottom, and which does not seep from cracks at the bottom of the wall cavity. Deviations in density, namely regions of greater density, are largely due to knit lines in which two differentially curing foam fronts which are expanding around obstructions, meet.

The above and other aspects of the invention are achieved by using low pressure, high boiling point blowing agents, either neat or as a miscible blend or azeotrope with other blowing agents, recognizing that the invention encompasses future blowing agents having characteristics defined herein, particularly higher boiling points.

In broad terms, the invention describes a process for filling a cavity with a frothable polyurethane or a polyisocyanurate foam system without bowing an interior wall of said cavity or seep from cracks at a bottom of said space prior to foaming, the process comprising the step of:

adding a two-component polyurethane or polyisocyanurate foam to said cavity, said foam comprising an effective amount of at least one blowing agent and miscible blends and azeotropes thereof, said blowing agent comprising formula (I):

$$[CV_a]_m\text{-}A\text{-}[CX_b]_n\text{—}B\text{—}[CY_c]_o\text{-}D\text{-}[CZ_d]_p$$

wherein
C is a carbon atom;
V, X, Y and Z are independently selected from the group consisting of H, F and Cl, therefore, as used above, permissible moieties for the first component of the Markush formula above, namely $[CV_a]$ could be $CF_3$—, $CHF_2$—, $CH_2F$—, $CCl_3$—, $CHCl_2$—, $CH_2Cl$—, $CH_3$—, $CHClF$—, $CCl_2F$—, $CF_2Cl$—, $CH=$, $CE$, $CF=$, $CCl=$, etc.;
a & d are independently selected from the integral values ranging from 0 to 3 inclusive;
b & c are independently selected from the integral values ranging from 0 to 2 inclusive;
o, p & n are equal to 1;
m is selected from the integral values ranging from 0 to 1 inclusive;
A, B and D are covalent bonds sufficient to satisfy the available bonding sites of adjacent carbon atoms, if such carbon atoms are present;
said blowing agent having a boiling point between approximately 5-50° C., and an ozone depletion potential of not greater than 0.05;
said foam system having a reaction profile gel and tack time which is less than approximately 90 seconds.

In Formula (I), the covalent bonds A, B and D are independently selected from the group consisting of single, double and triple covalent bonds. The blowing agents for which Formula (I) is depicting a Markush formula, are selected from the group consisting of HFC-245fa, HFC-365mfc, HBA-2, FEA-1100, AFA-L1, AFA-L2, miscible blends and azeotropes thereof and further wherein formula (I) is a major amount of said blowing agent.

The blowing agent has preferably has a boiling point between approximately 10-40° C. When using the process and blowing agents described, the reaction profile gel and tack time is less than approximately 60 seconds, more preferably less than approximately 45 seconds. Flame retardancy is enhanced by the use of a halogenated aromatic polyol, preferably in combination with a sucrose polyether polyol with a functionality of at least 4, most preferably in combination with at least three different catalysts. The vapor pressure of the at least one blowing agent is approximately 5 to 30 psig at 75° F. (equivalently 24° C.).

The invention and blowing agents applicable therein are not limited to 3-4 carbon moieties, but are capable of being 4-6 carbon moieties as illustrated below in Formula (II),

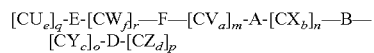

wherein
C is a carbon atom;
U, W, V, X, Y and Z are independently selected from the group consisting of H, F and Cl, placing similar constructs on the Markush formula components as illustrated with Formula (I);
d & e are independently selected from the integral values ranging from 0 to 3 inclusive;
a, b, c & f are independently selected from the integral values ranging from 0 to 2 inclusive;
o, p & n are equal to 1;
m, q & r are independently selected from the integral values ranging from 0 to 1 inclusive;
A, B, D, E and F are covalent bonds sufficient to satisfy the available bonding sites of adjacent carbon atoms, if such carbon atoms are present;
said blowing agent having a boiling point between approximately 5-50° C., and an ozone depletion potential of not greater than 0.05;
said foam system having a reaction profile gel and tack time which is less than approximately 90 seconds;
said blowing agent being non-flammable.

In a manner similar to that described previously, the covalent bonds A, B, D, E and F are independently selected from the group consisting of single, double and triple covalent bonds. Illustrative examples of blowing agents falling within Formula (II) include HFC-245fa, HBA-2, FEA-1100, AFA-L1, AFA-L2, miscible blends and azeotropes thereof and further wherein formula (II) is a major amount of said blowing agent. The blowing agent has a boiling point between approximately 10-40° C. and the polymer system will have a reaction profile gel and tack time which is less than approximately 90 seconds, more preferably less than approximately 60 seconds, most preferably less than approximately 45 seconds. In the process, the polyol side of the formulation will include a halogenated aromatic polyol, preferably in combination with a sucrose polyether polyol with a functionality of at least 4, and further in combination with at least three different catalysts. The vapor pressure of the blowing agent will preferentially fall within the range of approximately 5 to 30 psig at 75° F. (24° C.).

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
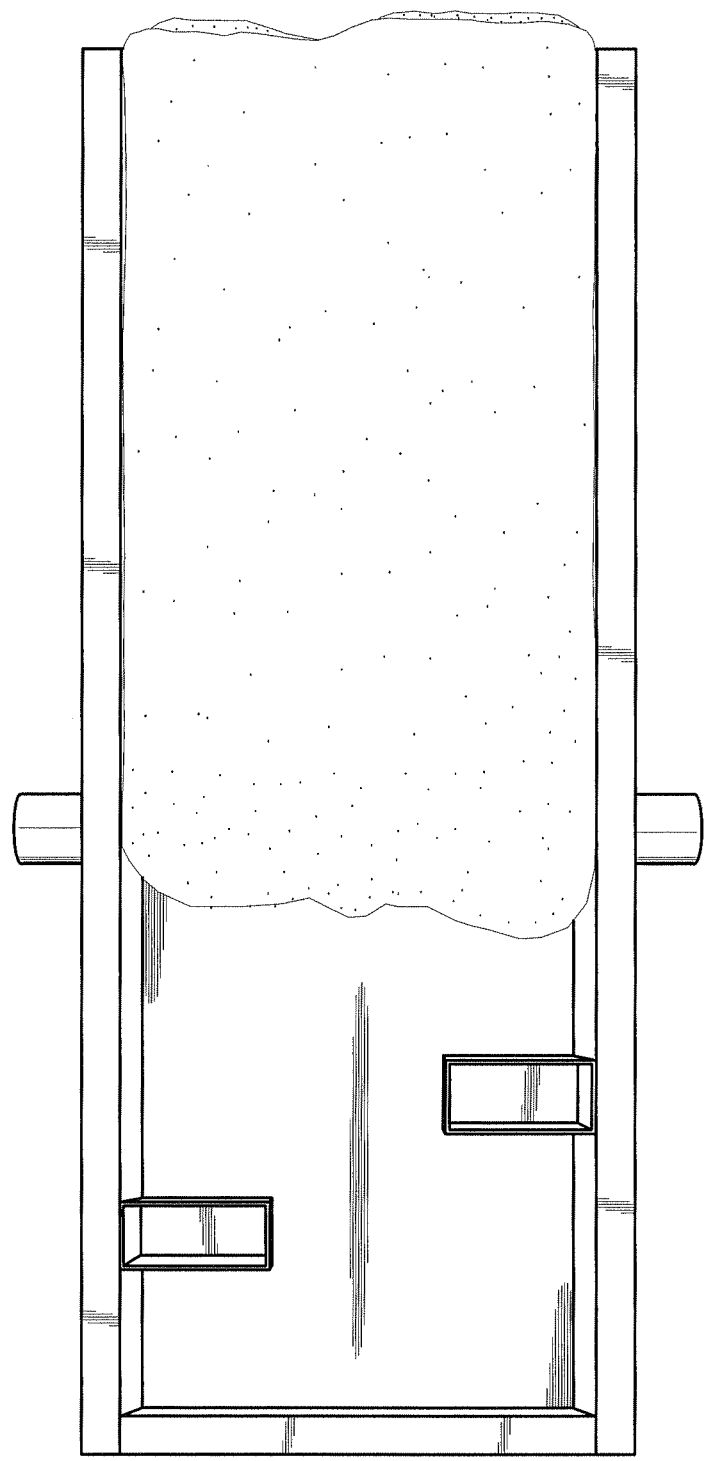
FIG. 1 is a front elevational view of the result of foaming the closed cell isocyanurate polymer of Example #1 into a cavity using HFC-134a as the blowing agent.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

The invention relates to improved polyurethane and polyisocyanurate foams, which employ at least an effective amount of a low pressure, higher boiling point blowing agent(s) including miscible blends thereof.

As used in this application, a non-limiting exemplary definition for the term "polyurethane" or "PUR", which includes mixtures of polyurethanes, means a class of reaction polymers in which a urethane linkage is produced by reacting an isocyanate group, —N=C=O with an hydroxyl (alcohol) group, —OH. Polyurethanes are produced by the polyaddition reaction of a polyisocyanate with a polyalcohol (polyol) in the presence of a catalyst and other additives. In this case, a polyisocyanate is a molecule with two or more isocyanate functional groups, R—(N=C=O)$_{\geq 2}$ and a polyol is a molecule with two or more hydroxyl functional groups, R'—(OH)$_{n\geq 2}$. The reaction product is a polymer containing the urethane linkage, —RNHCOOR'—. Isocyanates will react with any molecule that contains an active hydrogen. Importantly, isocyanates react with water to form a urea linkage and carbon dioxide gas. Commercially, polyurethanes are produced by reacting a liquid isocyanate with a liquid blend of polyols, catalyst, and other additives. The isocyanate is commonly referred to in North America as the "A-side" or just the "iso". The blend of polyols and other additives is commonly referred to as the "B-side" or as the "poly". In Europe these meanings are reversed.

As used in this application, a non-limiting exemplary definition for the term "isocyanate", which includes mixtures of isocyanates, means a moiety which contains an N—C=O arrangement of chemical elements. Molecules that contain two isocyanate groups are called diisocyanates. Isocyanates can be classed as aromatic, such as diphenylmethane diisocyanate ("MDI") or toluene diisocyanate ("TDI"); or aliphatic, such as hexamethylene diisocyanate ("HDI"). An example of a polymeric isocyanate is polymeric diphenylmethane diisocyanate, which is a blend of molecules with two-, three-, and four- or more isocyanate groups, with an average functionality of 2.7. Isocyanates can be further modified by partially reacting them with a polyol to form a prepolymer. Important characteristics of isocyanates are their molecular backbone, % —N—C=O content, functionality, and viscosity. Any organic polyisocyanate can be employed in the polyurethane or polyisocyanurate foam synthesis inclusive of aliphatic and aromatic polyisocyanates. Suitable organic polyisocyanates include aliphatic, cycloaliphatic, arylaliphatic, aromatic, and heterocyclic isocyanates which are well known in the field of polyurethane chemistry. Representative organic polyisocyanates correspond to the formula:

$$R(NCO)_z$$

wherein R is a polyvalent organic radical which is either aliphatic, arylalkyl, aromatic or mixtures thereof, and z is an integer which corresponds to the valence of R and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2'5,5-'tetraisocyanate, and the like; arylalkyl polyisocyanates such as xylylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4, 4'-diisocyanate; Typical aliphatic polyisocyanates are alkylene diisocyanates such as trimethylene diisocyanate, tetramethylene diisocyanate, and hexamethylene diisocyanate, isophorene diisocyanate, 4,4'-methylenebis(cyclohexyl isocyanate), and the like; typical aromatic polyisocyanates include m-, and p-phenylene diisocyanate, polymethylene polyphenyl isocyanate, 2,4- and 2,6-toluenediisocyanate, dianisidine diisocyanate, bitoylene isocyanate, naphthylene 1,4-diisocyanate, bis(4-isocyanatophenyl)methene, bis(2-methyl-4-isocyanatophenyl)methane, and the like.

As used in this application, a non-limiting exemplary definition for the term "polyol", which includes mixtures of polyols, can be any polyol which reacts in a known fashion with an isocyanate in preparing a polyurethane or polyisocyanurate foam. In one sense, polyol means a moiety which contains more than one hydroxyl group. Molecules that contain two hydroxyl groups are called diols, those with three hydroxyl groups are called triols, et cetera. Polyols are polymers in their own right. They are formed by base-catalyzed addition of propylene oxide ("PO"), ethylene oxide ("EO") onto a hydroxyl or amine containing initiator, or by polyesterification of a di-acid, such as adipic acid, with glycols, such as ethylene glycol ("EG") or dipropylene glycol ("DPG"). Polyols extended with PO or EO are polyether polyols. Polyols formed by polyesterification are polyester polyols. The choice of initiator, extender, and molecular weight of the polyol greatly affect its physical state, and the physical properties of the polyurethane polymer. Important characteristics of polyols are their molecular backbone, initiator, molecular weight, % primary hydroxyl groups, functionality, and viscosity. Useful polyols comprise one or more of a sucrose containing polyol; phenol, a phenol formaldehyde containing polyol; a glucose containing polyol; a sorbitol containing polyol; a methylglucoside containing polyol; an aromatic polyester polyol; polyols derived from natural products (e.g. soy beans), glycerol; ethylene glycol; diethylene glycol; propylene glycol; graft copolymers of polyether polyols with a vinyl polymer; a copolymer of a polyether polyol with a polyurea; one or more of (a) condensed with one or more of (b) as illustrated by (a) glycerine, ethylene glycol, diethylene glycol, trimethylolpropane, ethylene diamine, pentaerythritol, soy oil, lecithin, tall oil, palm oil, castor oil; and (b) ethylene oxide, propylene oxide, a mixture of ethylene oxide and propylene oxide; or combinations thereof.

As used in this application, a non-limiting exemplary definition for the term "polyol premix", which includes mixtures of polyol premixes, means a polyol premix which includes a catalyst. Useful catalysts are primary amines, secondary amines or most typical tertiary amines. Useful tertiary amine catalysts non-exclusively include dicyclohexylmethylamine; ethyldiisopropylamine; dimethylcyclohexylamine; dimethylisopropylamine; methylisopropylbenzylamine; methylcyclopentylbenzylamine; isopropyl-sec-butyl-trifluoroethylamine; diethyl-(α-phenylethyl)amine, tri-n-propylamine, or combinations thereof. Useful secondary amine catalysts non-exclusively include dicyclohexylamine; t-butylisopropylamine; di-t-butylamine; cyclohexyl-t-butylamine; di-sec-butylamine, dicyclopentylamine; di-(α-trifluoromethylethyl)amine; di-α-phenylethyl)amine; or combinations thereof. Useful primary amine catalysts non-exclusively include: triphenylmethylamine and 1,1-diethyl-n-propylamine. Other useful amines include morpholines, imidazoles, ether containing compounds, and the like. These include dimorpholinodiethylether; N-ethylmorpholine; N-methylmorpholine; bis(dimethylaminoethyl)ether; imidazole; n-methylimidazole; 1,2-dimethylimidazol; dimorpholinodimethylether; N,N,N',N',N'',N''-pentamethyldiethylenetriamine; N,N,N',N',N'',N''-pentaethyldiethylenetriamine; N,N,N',N',N'',N''-pentamethyldipropylenetriamine; bis(diethylaminoethyl)ether; and bis(dimethylaminopropyl)ether. The polyol premix composition may contain an optional silicone surfactant. The silicone surfactant is used to form a foam from the mixture, as well as to control surface tension that impacts the size of the bubbles of the foam so that a foam of a desired open or closed cell structure is obtained. Preferably, a foam with small bubbles or cells therein of uniform size is desired since it has the most desirable physical properties such as compressive strength and thermal conductivity. Also, it is critical to have a foam with stable cells which do not collapse prior to forming or during foam rise. The polyol premix composition may optionally contain a non-silicone surfactant, such as a non-silicone, non-ionic surfactant. These may include oxyethylated alkylphenols, oxyethylated fatty alcohols, paraffin oils, castor oil esters, ricinoleic acid esters, turkey red oil, groundnut oil, paraffins and fatty alcohols. A preferred non-silicone surfactant is LK-443 which is commercially available from Air Products Corporation.

As used in this application, a non-limiting exemplary definition for the term "polyisocyanurate" or "PIR", which includes mixtures of polyisocyanurates, means the reaction the reaction product of MDI and a polyol, which typically takes place at higher temperatures compared to the reaction temperature for the manufacture of PUR. Without being limited to any theory of operation or synthesis, at these elevated temperatures and in the presence of specific catalysts, MDI will first react with itself, producing a stiff, ring molecule, which is a reactive intermediate (a tri-isocyanate isocyanurate compound). Remaining MDI and the tri-isocyanate react with polyol to form a complex poly(urethane-isocyanurate) polymer, which is foamed in the presence of a suitable blowing agent. This isocyanurate polymer has a relatively strong molecular structure, because of the combination of strong chemical bonds, the ring structure of isocyanurate and high cross link density, each contributing to the greater stiffness than found in comparable polyurethanes. The greater bond strength also means these are more difficult to break, and as a result a PIR foam is chemically and thermally more stable: breakdown of isocyanurate bonds is reported to start above 200° C., compared with urethane at 100 to 110° C. PIR typically has an MDI/polyol ratio, also called its index (based on isocyanate/polyol stoichiometry to produce urethane alone), of between 200 and 500. By comparison PUR indices are normally around 100. As the index increases material stiffness but also brittleness also increase, although the correlation is not linear. Depending on the product application greater stiffness, chemical and/or thermal stability may be desirable. As such PIR manufacturers offer multiple products with identical densities but different indices in an attempt to achieve optimal end use performance.

As used in this application, a non-limiting definition for the term "blowing agent" which includes miscible mixtures and azeotropes of blowing agents, means a propellant or solvent which are useful and provide efficacy to various applications in the form of insulation performance, pressure performance, or solubility, without deleterious effect due to molar gas volume, flammability migration, or GWP reduction, yet which have a vapor pressure within defined limits as defined herein. Exemplary and non-limiting blowing agents include HFC-245fa (Honeywell Intl.), namely 1,1,1,3,3 pentafluoropentane or FEA-1100 (DuPont), namely 1,1,1,4,4,4 hexafluoro-2-butene.

It is often necessary or even desirable to mitigate the global warming potential ("GWP") of blowing agent, aerosol, or solvent compositions. As used herein, GWP is measured relative to that of carbon dioxide and over a 100 year time horizon, as defined in "The Scientific Assessment of Ozone Depletion, 2002, a report of the World Meteorological Association's Global Ozone Research and Monitoring Project." In certain preferred forms, the present compositions also preferably have an Ozone Depletion Potential ("ODP") of not greater than 0.05, more preferably not greater than 0.02 and even more preferably about zero. As used herein, "ODP" is as defined in "The Scientific Assessment of Ozone Depletion, 2002, A Report of the World Meteorological Association's Global Ozone Research and Monitoring Project."

As used herein, a non-limiting definition for the term "co-blowing agent" which includes mixtures or miscible blends and/or azeotropes of blowing agents, means a one or more co-blowing agents, co-propellants, or co-solvents which are useful and provide efficacy to various applications in the form of insulation performance, pressure performance, or solubility, without deleterious effect due to molar gas volume, flammability mitigation, or GWP reduction. These co-agents include but are not limited to: one or more additional components of hydrofluorocarbons, $C_1$ to $C_6$ hydrocarbons, $C_1$ to $C_8$ alcohols, ethers, diethers, aldehydes, ketones, hydrofluoroethers, $C_1$ to $C_4$ chlorocarbons, methyl formate, water, carbon dioxide, $C_3$ to $C_4$ hydrofluoroolefins, and $C_3$ to $C_4$ hydrochlorofluoroolefins. Examples of these non-exclusively include one or more of difluoromethane, trans-1,2-dichloroethylene, difluoroethane, 1,1,1,2,2-pentafluoroethane, 1,1,2,2-tetrafluoroethane, 1,1,1,2-tetrafluoroethane, 1,1,1-trifluoroethane, 1,1-difluoroethane, fluoroethane, hexafluoropropane isomers, including HFC-236fa, pentafluoropropane isomers of HFC-245fa, heptafluoropropane isomers, including HFC-227ea, hexafluorobutane isomers, and pentafluorobutane isomers including HFC-365mfc, tetrafluoropropane isomers, and trifluoropropene isomers (HFO-1243). Specifically included are all molecules and isomers of HFO-1234, including 1,1,1,2-tetrafluoropropene (HFO-1234yf), and cis- and trans-1,2,3,3-tetrafluoropropene (HFO-1234ye), HFC-1233zd, and HFC-1225ye. Preferred co-blowing agents non-exclusively include: hydrocarbons, methyl formate, halogen containing compounds, especially fluorine containing compounds and chlorine containing compounds such as halocarbons, fluorocarbons, chlorocarbons, fluorochlorocarbons, halogenated hydrocarbons such as hydrofluorocarbons, hydrochlorocarbons, hydrofluorochlorocarbons, hydrofluoroolefins, hydrochlorofluoroolefins, $CO_2$, $CO_2$ generating materials such as water, and organic acids that produce $CO_2$ such as formic acid. Examples non-exclusively include low-boiling, aliphatic hydrocarbons such as ethane, propane(s), i.e. normal pentane, isopropane, isopentane and cyclopentane; butanes(s), i.e. normal butane and isobutane; ethers and halogenated ethers; trans 1,2-dichloroethylene, pentafluorobutane; pentafluoropropane; hexafluoropropane; and heptafluoropropane; 1-chloro-1,2,2,2-tetrafluoroethane (HCFC-124); and 1,1-dichloro-1-fluoroethane (HCFC-141b) as well as 1,1,2,2-tetrafluoroethane (HFC-134); 1,1,1,2-tetrafluoroethane (HFC-134a); 1-chloro 1,1-difluoroethane (HCFC-142b); 1,1,1,3,3-pentafluorobutane (HFC-365mfc); 1,1,1,2,3,3,3-heptafluoropropane (HCF-227ea); trichlorofluoromethane (CFC-11), dichlorodifluoromethane (CFC-12); 1,1,1,3,3,3-hexafluoropropane (HFC-236fa); 1,1,1,2,3,3-hexafluoropropane (HFC-236ea); difluoromethane (HFC-32); difluoroethane (HFC-152a); trifluoropropenes, pentafluoropropenes, chlorotrifluoropropenes, tetrafluoropropenes including 1,1,1,2-tetrafluoropropene (HFO-1234yf), 1,1,1,2,3-pentafluoropropene (HFO-1225ye), and 1-chloro-3,3,3-trifluoropropene (HCFC-1233zd). Combinations of any of the aforementioned are useful. The relative amount of any of the above noted additional co-blowing agents, as well as any additional components included in present compositions, can vary widely within the general broad scope of the present invention according to the particular application for the composition, and all such relative amounts are considered to be within the scope hereof.

As used herein, a non-limiting definition for the term, "effective amount" means a quantity sufficient to improve the result of the foaming operation when compared to a control without the added low pressure blowing agent.

As used herein, a non-limiting definition for the term, "higher boiling point blowing agent" means a blowing agent having a boiling point at atmospheric pressure of between ~5° C. to ~50° C., more preferably ~10° C. to ~40° C.

As used herein, a non-limiting definition for the term "lower pressure blowing agent" means a blowing agent having a vapor pressure of between ~5 psig to ~30 psig at approximately room temperature, ~75° F. (equivalently ~34.5 kPa to ~206.9 kPa at approximately room temperature, ~24° C.).

As used herein, a non-limiting definition for the term "approximately" means a deviation from the stated end points of a range of 10%.

As used herein, a non-limiting definition for "bowing" means a deviation from planarity across a defined gap in which the interior wall does not exhibit cracking after the filling of the cavity with the foam system of the invention. Interior walls are typically made from drywall or plasterboard or gypsum board having a thickness of between approximately ¼ and ¾ inches (equivalently 0.64 and 1.91 cm) and fastened between wall studs or ceiling joists.

As used herein, a non-limiting definition for "seep" means the ability to visually see pre-polymer froth in at least a semi-liquid state which oozes from cracks at a bottom of the cavity.

One aspect of the present invention provides foamable compositions. As is known to those skilled in the art, foamable compositions generally include one or more foam forming agents capable of forming a foam and a blowing agent.

This includes a component, or a combination on components, which are capable of forming a foam structure, preferably a generally cellular foam structure. The foamable compositions of the present invention include such components and the above described blowing agent compound in accordance with the present invention. In certain embodiments, the one or more components capable of forming foam comprise a thermosetting composition capable of forming foam and/or foamable compositions. Examples of thermosetting compositions include polyurethane and polyisocyanurate foam compositions. These include polyurethane pre-polymers. This reaction and foaming process may be enhanced through the use of various additives such as catalysts and surfactant materials that serve to control and adjust cell size and to stabilize the foam structure during formation. Furthermore, it is contemplated that any one or more of the additional components described above with respect to the blowing agent compositions of the present invention could be incorporated into the foamable composition of the present invention. In such thermosetting foam embodiments, one or more of the present compositions are included as or part of a blowing agent in a foamable composition, or as a part of a two or more part foamable composition, which preferably includes one or more of the components capable of reacting and/or foaming under the proper conditions to form a foam or cellular structure.

The polymerization reaction is catalyzed by tertiary amines, such as dimethylcyclohexylamine, and organometallic compounds, such as dibutyltin dilaurate or bismuth octanoate. Furthermore, catalysts can be chosen based on whether they favor the urethane (gel) reaction, such as 1,4-diazabicyclo[2.2.2]octane (also called DABCO or TEDA), or the urea (blow) reaction, such as bis-(2-dimethylaminoethyl) ether, or specifically drive the isocyanate trimerization reaction, such as potassium octoate.

At its simplest level, the distinction between PIR and PUR polymers is not large. The proportion of MDI is higher than for PUR and instead of a polyether polyol, a polyester derived polyol is used in the reaction. Catalysts and additives used in PIR formulations also differ from those used in PUR.

The properties of foam expansion agents is listed in Table I, as well as various physical properties therewith.

TABLE I

|  | CFC-11 | HCFC-141b | HFC-245fa | HFC-134a | HFC-365mfc | Isopentane | FEA-1100 |
|---|---|---|---|---|---|---|---|
| ODP | 1 | 0.12 | 0 | 0 | 0 | 0 | 0 |
| GWP (100 year ITH) | 4750 | 725 | 1020 | 1300 | 782 | 11 | 5 |
| E gas 25° C. mW/mK | 8.4 | 9.7 | 12.7 |  | 10.5 | 13.3 | 10.7 |
| Flash Point | None | None | None | None | −25.0° C. | −51° C. | None |
| bp ° C. | 23.9 | 32.1 | 15.3 | −26.3 | 40.0 | 27.9 | >25 |

The experimental data presented herein centers on the use of a low vapor pressure blowing agent, such as that illustrated by either HFC-245fa (1,1,1-3,3-pentafluoropropane) or FEA-1100 (1,1,1,4,4,4-hexafluoro-2-butene), used alone or in miscible blends with other blowing agents. Both FEA-1100 (DuPont) and HFC-245fa have low vapor pressures at room temperature. Both blowing agents have a vapor pressure at 50° C. which is well below that of a typical drum pressure rating of 22 psig. Additional fourth generation blowing agents are also within the scope of this invention, e.g., AFA-L1 & AFA-L2 (Arkema), HBA-2 (Honeywell) or trans-1-chloro-3,3,3-trifluoropropene) in that they also meet the criteria of higher boiling point and lower vapor pressure as defined herein with minimal to no ozone depletion potential.

The choice of blowing agent is largely driven by the Environmental Protection Agency of the United States ("EPA"), a zero ozone-depletion potential ("ODP"), as well as Department of Transportation ("DOT") flammability regulations. Environmental concerns with ozone depletion rule out the use of the extremely ozone-depleting CFC-1, banned in 1995, and HCF-141b, banned in 2003. Without restricting this invention to the exclusive use of non-flammable blowing agents in a composition, in a preferred embodiment, non-flammable blowing agents are preferred over flammable blowing agents. DOT regulations prevent the filling of commonly-used, standard-in-the-industry disposable and refill cylinders with flammable blowing agents. From the above chart, this leaves HFC-134a, HFC-245fa and FEA-1100 as the only permissible blowing agents. The intent of the invention is to produce a low pressure build, PUR/PIR insulation system applied via low pressure disposable and refill equipment that demonstrates superior flowability while maintaining desirable properties such as being dimensionally stable (will not shrink) provide for an air barrier and insulate. As demonstrated in FIGS. 1-9, HFC-134a is eliminated from being a suitable blowing agent due to its low boiling point. Upon dispensing HFC-134a blown formulations from low pressure systems, the rapid expansion of the foam and viscous, frothy state of the foam prevent the system from flowing around cavity obstructions and thereby produces undesirable void spaces in the cavity resulting in a compromised air seal and insufficient insulation. This dictates that only non-flammable, non-ozone depleting blowing agents with relatively high boiling points can effectively provide for adequate filling of an obstructed cavity. Though it is intuitively obvious that the greater the solubility of the blowing agent the greater the flow of the resultant froth, this factor does not dictate performance as does the high boiling point of the blowing agent. The KB value of HFC-245fa is six (6) while the KB value of FEA-1100 is seven (7). The kauri-butanol value is a semi-qualitative measure of a blowing agent's solubility in a standard solution of kauri gum in butyl alcohol as outlined in ASTM D 1133. It is also counterintuitive that the quick reaction profile of the compositions of this invention would essentially completely fill a cavity wall, when conventional wisdom would instruct a formulator that reaction profiles with long cream times would be more effective, as discussed in later paragraphs.

Without being limited to any one theory or mode of operation, it is believed that the combination of a higher boiling point in the range of approximately 5° C. to 50° C., more preferably approximately 10° C. to 40° C. provides the unexpected flowability results of this invention.

The following examples were synthesized and tested in Table II.

TABLE II

| Example | #1 | #2 | #3 | #4 |
|---|---|---|---|---|
| A/B ratio | 1.15 | 1.14 | 1.03 | 1.11 |
| Polyol | Polyester polyol | Polyester polyol | Polyether polyol | Polyether polyol |
| Isocyanate | polymeric MDI | polymeric MDI | polymeric MDI | polymeric MDI |
| Cell-type | Closed | Closed | Closed | Closed |
| Polymer type | PIR | PIR | PUR | PUR |
| Gel time (min:sec) | 1:43 | 0:58 | 2:30 | 2:57 |
| Tack-Free time (min:sec) | 3:05 | 1:49 | 3:45 | 4:15 |
| Density (free rise) | 1.80 | 1.38 | 1.62 | 1.80 |
| R-value | 6.6 | 5.2 | 4.7 | 6.5 |
| % closed | 86.3% | 85.0% | 26.0% | 66.2% |
| Est. % bowing | ~7% | 0 | ~14% | 0 |
| Foaming agent | HFC-134a | HFC-245fa | HFC-134a | HFC-245fa |
| (A % + B %) | (30%) | (30%) | (26%) | (26%) |
| B-Side (50-75% polyols) [(1)] | 80% | 80% | 82% | 82% |
| R-134a | 20% |  | 18% |  |
| HFC-245fa |  | 20% |  | 18% |
| FEA-1100 |  |  |  |  |
| A-Side (90-95% isocyanates) [(2)] | 90% | 90% | 92% | 92% |

TABLE II-continued

| | | | | | |
|---|---|---|---|---|---|
| R-134a | | 10% | | 8% | |
| HFC-245fa | | | 10% | | 8% |
| FEA-1100 | | | | | |

| Example | #5 | #6 | #7 | #8 | #9 |
|---|---|---|---|---|---|
| A/B ratio | 0.89 | 1.12 | 1.22 | 1.12 | 0.96 |
| Polyol | Polyether triol | Polyether triol | Polyether triol | Sucrose polyol/ polyester polyol blend | Sucrose polyol/ polyester polyol blend |
| Isocyanate | polymeric MDI | polymeric MDI | polymeric MDI | polymeric MDI | polymeric MDI |
| Cell-type | Open | Open | Open | Closed | Closed |
| Polymer type | PUR | PUR | PUR | PIR | PIR |
| Gel Time (min:sec) | 0:24 | 0:32 | 0:25 | 0:24 | 0:26 |
| Tack-Free (min:sec) | 0:30 | 0:45 | 0:31 | 0:40 | 0:52 |
| Density (free rise) | 0.73 | 0.99 | 1.23 | 1.82 | 1.45 |
| R-value | 4.2 | 3.7 | 4.0 | 6.8 | 6.9 |
| % closed | 0.65% | 1.50% | 1.23% | 94.0% | 77.7% |
| Est. % bowing | 0 | 0 | 0 | ~13% | ~7% |
| Foaming agent (A % + B %) | HFC-134a (21%) | HFC-245fa (21%) | FEA-1100 (21%) | HFC-134a (26%) | HFC-245fa (26%) |
| B-Side (50-75% polyols) [1] | 85% | 85% | 85% | 82% | 82% |
| R-134a | 15% | | | 18% | |
| HFC-245fa | | 15% | | | 18% |
| FEA-1100 | | | 15% | | |
| A-Side (90-95% isocyanates) [2] | 94% | 94% | 94% | 92% | 92% |
| R-134a | 6% | | | 8% | |
| HFC-245fa | | 6% | | | 8% |
| FEA-1100 | | | 6% | | |

[1] The "B" side contains various polyols, catalysts and water.
[2] The "A" side contains isocyanates In one aspect of the invention, a disposable and/or refillable pressurized two-component foam formulation is illustrated. The system is optionally, but preferably, portable. The propellant is preferably a high boiling point propellant with minimal to zero ozone depleting potential in addition to a stable shelf life.

In another aspect of the invention, a low density foam is achieved by the incorporation of difunctional flame retardants into the formulation that do not terminate the polyurethane polymerization reaction. Additionally, a further enhancement is obtained by the incorporation of a difunctional surfactant that does not chain terminate while additionally functioning to emulsify the highly incompatible water and hydrophilic components with the hydrophobic flame retardants.

In yet another aspect of the invention, the amount of flame retardant is adjusted to secure a Class II rating. This rating can be increased to a Class I E-84 Steiner Tunnel test rating by the synergistic blend incorporation of chlorinated phosphate flame retardant in combination with a brominated aromatic diol.

Example #10

The following compositions were added in yet another combination to test experimental wall fills to determine the value of adding the foam.

| | Comments | Weight Percent |
|---|---|---|
| Polyol | | |
| [brominated phthalate diol structure] | The 43% bromine assists in flame retardation whereas the phthalate aromatic ring adds thermal stability. The difunctional hydroxyl group reacts in the resin matrix by increasing thermal and dimensional stability. A synergistic effect was observed when coupled with tris(2-chloropropyl) phosphate. | 2-15% |

| | Comments | Weight Percent |
|---|---|---|
| 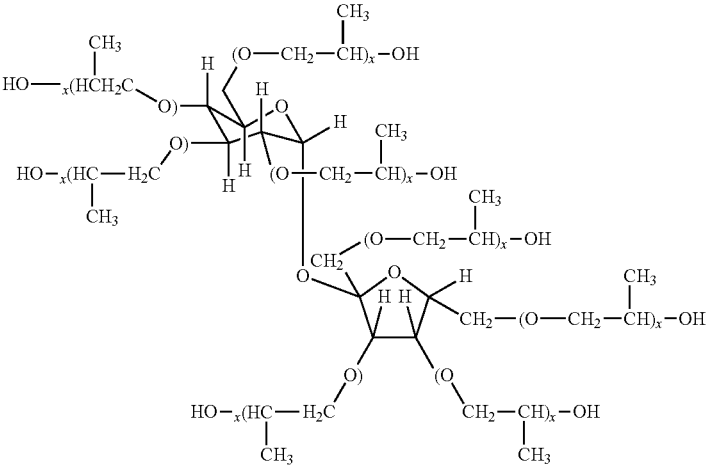 | The sucrose polyether polyol with a functionality of 5 ensures dimensional stability in a flexible foam/ high water content formulation. No glycerine is present. The polyol has a hydroxyl number of between 450-490 with 33,000 cPs, 600 M.W. | 2.2-8.5% |
| Plasticizer | | |
| Polyoxyethylene nonylphenyl ether, branched, phosphate | The composition is a hydrotope for solubilizing hydrophobic compounds in aqeuous solutions. It is compatible with a high concentration of non-ionic surfactants and has a synergistic effect in combinbation with them. | 4.5-10.5% |
| Flame Retardant | | |
| 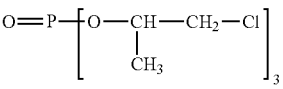 | The composition supplies elemental phosphorus at 9.3% by weight and supplies elemental chloride at 33.0% by weight (both Class I ratings). | 35-50% |
| Surfactant | | |
| 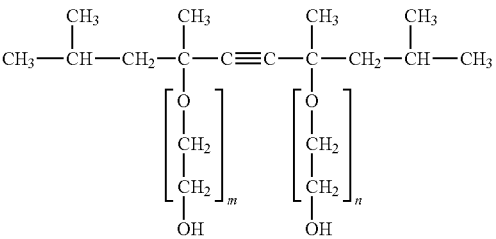 | The use of difunctional surfactants maintains dimensional and thermal stability while emulsifying. The functionality of two does not chain terminate as occurs with nonylphenols. It is more effective than conventional nonionic surfactants and has an HLB of 17. | 9-15% |
| 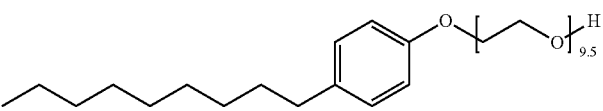 | The composition is added to optimize emulsification only with an HLB of 13.1 and 65.5% ethylene oxide content and a M.W. = 638. It does suffer from monofunctionality chain terminating. The composition does aid in stabilizing the emulsion. | 0.5-4% |
| L12-8 ethoxylated alcohol (dodecyl alcohol ethoxylate) | The composition is added to optimize the emulsification only with an HLB = 13.6 and 68% ethylene oxide content and a M.W. = 516. | 0.05-3% |

|  | Comments | Weight Percent |
|---|---|---|
| 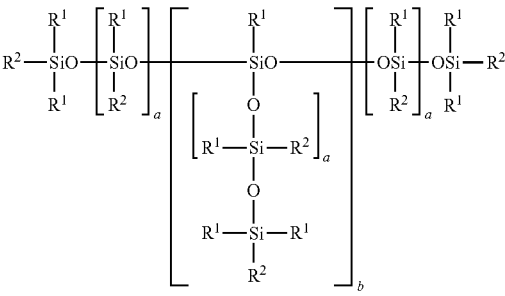 | The polyethersiloxane assists in providing an optimal flexible polyurethane foam surfactant. It has strong nucleation and froth-support effect, releasing $CO_2$. | 1-7% | and wherein the radicals
$R^1$ are alkyl radicals or aryl radicals,
$R^2$ are $R^1$ and/or $R^3$ and/or $R^4$,
$R^3$ is a polyether radical of the formula II
$-(Y)_e[O(C_2H_{4-d}R'_dO)_m(C_xH_{2x}O)_pZ]_w$
with the proviso that
$e = 0$ or 1,
$w = 1$ to 4,
$d = 1$ to 3,
$m \geq 1$,
$x = 2$ to 4, wherein x is 2, 3 and/or 4 in the same polyether radical; i.e., x is such that a polyether radical may contain $C_2H_4O-$, $C_3H_6O-$ and $C_4H_8O-$ units either individually or in combination, and
$p \geq 1$, and
Y is a (w + 1)- valent hydrocarbon radical which may be branched,
R' is selected from the group consisting of monovalent, aliphatic or aromatic hydrocarbon radicals preferably having from 3 to 18 carbon atoms,
Z is hydrogen or a monovalent organic radical including an acyl radical, the sum $m + p = 1$ to 150,
$R^4$ is a polyether radical of the formula III
$-(F)_f[O(C_xH_{2x}O)_rZ]_g$
with the proviso that
$f = 0$ or 1,
$x = 2$ to 4,
$g = 1$ to 4, and
F is a (g + 1)- valent hydrocarbon radical which may be branched,
a is from 1 to 100 when b is from 6 to 8,
a is from 1 to 200 when b is from 3 to 6,
a is from 1 to 300 when b is from 0 to 3,
$b = 0$ to 8.

Catalyst

|  | Comments | Weight Percent |
|---|---|---|
| 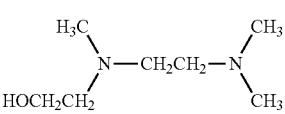 | The amine is specific to water-isocyanate blowing reactions and promotes a smooth blowing profile. The monofunctionality provides for low odor and non-migration of the amine. | 1-6% |
| 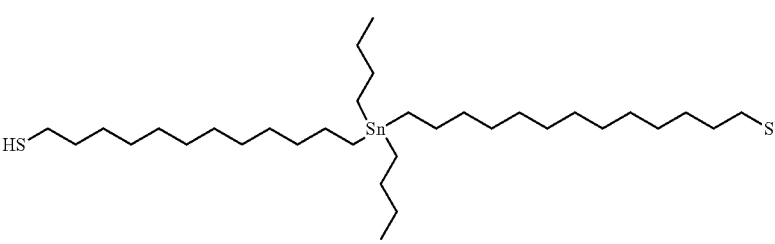 | The butyl ligands provides enhanced catalyst stbility in a high water formulation. The catalytic activity creates a high exotherm to drive the polymerization and foam reactions. | 0.5-5% |

| | Comments | Weight Percent |
|---|---|---|
| 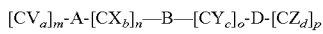 H$_3$C\N—CH$_2$CH$_2$—N(CH$_3$)—CH$_2$CH$_2$—N(CH$_3$)$_2$ / H$_3$C | The composition is to provide a balanced, blowing/gelation catalyst as used in PIR/PUR formulations. | 0.01-4% |

The above "B" side (50-75% polyols) was mixed with an "A" side (90-95% PMDI) having an average functionality of 2.7, in an approximately 50/50 ratio with an appropriate amount of propellant necessary to bring the total of each side to 100%.

| Blowing Agents | Common Name | M.W. | B.P. | ODP |
|---|---|---|---|---|
| CF$_3$CH$_2$CHF$_2$ | HFC-245fa | 134 | 15.3° C. | 0 |
| CF$_3$CH$_2$CF$_2$CH$_3$ | HFC-365mfc | 148 | 40.2° C. | 0 |
| CF$_3$CH=CH$_2$Cl | HBA-2 | 131 | 19° C. | 0 |
| CF$_3$CH=CHCF$_3$ | FEA-1100 | 164 | 33° C. | 0 |
| | AFA-L1 | <134 | >10° C. and <30° C. | 0 |
| | AFA-L2 | <134 | >10° C. and <30° C. | 0 |

While the above blowing agents are listed individually, it is recognized that miscible binary and ternary blends of the agents listed above, in addition to miscible blends which fall both within the higher boiling point range as well as outside the range, are useful in the practice of the invention. At least one of the agents (preferably the blowing agent in the major amount) will fall within the higher boiling point range.

Listed more generically, the blowing agents having up to four carbon atoms in their backbone and which are useful in this invention fall within the general formula (I) illustrated below:

$$[CV_a]_m\text{-A-}[CX_b]_n\text{—B—}[CY_c]_o\text{-D-}[CZ_d]_p$$

wherein

C is a carbon atom;

V, X, Y & Z are independently selected from the group consisting of H, F and Cl (with similar definitions applied as illustrated previously);

a & d are independently selected from the integral values ranging from 0 to 3 inclusive;

b & c are independently selected from the integral values ranging from 0 to 2 inclusive;

o, p & n are equal to 1;

m is selected from the integral values ranging from 0 to 1 inclusive;

A, B & D are covalent bonds sufficient to satisfy the available bonding sites of adjacent carbon atoms, if such carbon atoms are present; and said blowing agent, including miscible blends and azeotropes thereof, having a boiling point between approximately 5-50° C., and an ozone depletion potential of essentially zero.

said foam system having a reaction profile gel and tack time which is less than approximately 90 seconds, more preferably less than approximately 60 seconds, most preferably less than approximately 45 seconds; and in a preferred embodiment, said blowing agent is non-flammable, recognizing that co-blowing agents may be flammable.

Listed more generically, the blowing agents having up to six carbon atoms in their backbone and which are useful in this invention fall within the general formula (II) illustrated below:

$$[CU_e]_q\text{-E-}[CW_f]_r\text{—F—}[CV_a]_m\text{-A-}[CX_b]_n\text{—B—}[CY_c]_o\text{-D-}[CZ_d]_p$$

wherein

C is a carbon atom;

U, W, V, X, Y and Z are independently selected from the group consisting of H, F and Cl (with similar definitions applied as illustrated previously);

d & e are independently selected from the integral values ranging from 0 to 3 inclusive;

a, b, c & f are independently selected from the integral values ranging from 0 to 2 inclusive;

o, p & n are equal to 1;

m, q & r are independently selected from the integral values ranging from 0 to 1 inclusive;

A, B, D, E and F are covalent bonds sufficient to satisfy the available bonding sites of adjacent carbon atoms, if such carbon atoms are present;

said blowing agent having a boiling point between approximately 5-50° C., and an ozone depletion potential of not greater than 0.05;

said foam system having a reaction profile gel and tack time which is less than approximately 90 seconds, more preferably less than approximately 60 seconds, most preferably less than approximately 45 seconds; and in a preferred embodiment, said blowing agent is non-flammable, recognizing that co-blowing agents may be flammable.

In a preferred embodiment, the blowing agent is a carbon-based moiety with defined fluorine atoms bonded to the carbon backbone. The boiling point of the blowing agent will be as defined previously as well as the vapor pressure.

The above "B" side (50-75% polyols) was mixed with an "A" side (90-95% PMDI) having an average functionality of 2.7, in an approximately 50/50 ratio with an appropriate amount of propellant HFC-245fa necessary to bring the total of each side to 100%.

When the formulation of Example #10 was used to insulate hollow exterior walls with multiple obstructions contained therein. A FLIR® Infrared Camera was employed to monitor fill, with a flow rate of approximately 7 lbs. of product per minute and a 90° wall fill dispensing guide tool. The following results were obtained:

| Test #1 | Test #2 | Test #3 |
|---|---|---|
| Blower door test results: 38.9% Reduction in air exchanges (ACH50) Pre-Blower Door: 1947 CFM50 Post Blower Door: 1190 CFM50 | Blower door test results: 52.4% Reduction in air exchanges (ACH50) Pre-Blower Door: 3130 CFM50 Post Blower Door: 1490 CFM50 | Blower door test results: 12.7% Reduction in air exchanges (ACH50) Pre-Blower Door: 4900 CFM50 Post Blower Door: 4280 CFM50 |

Figure 10:
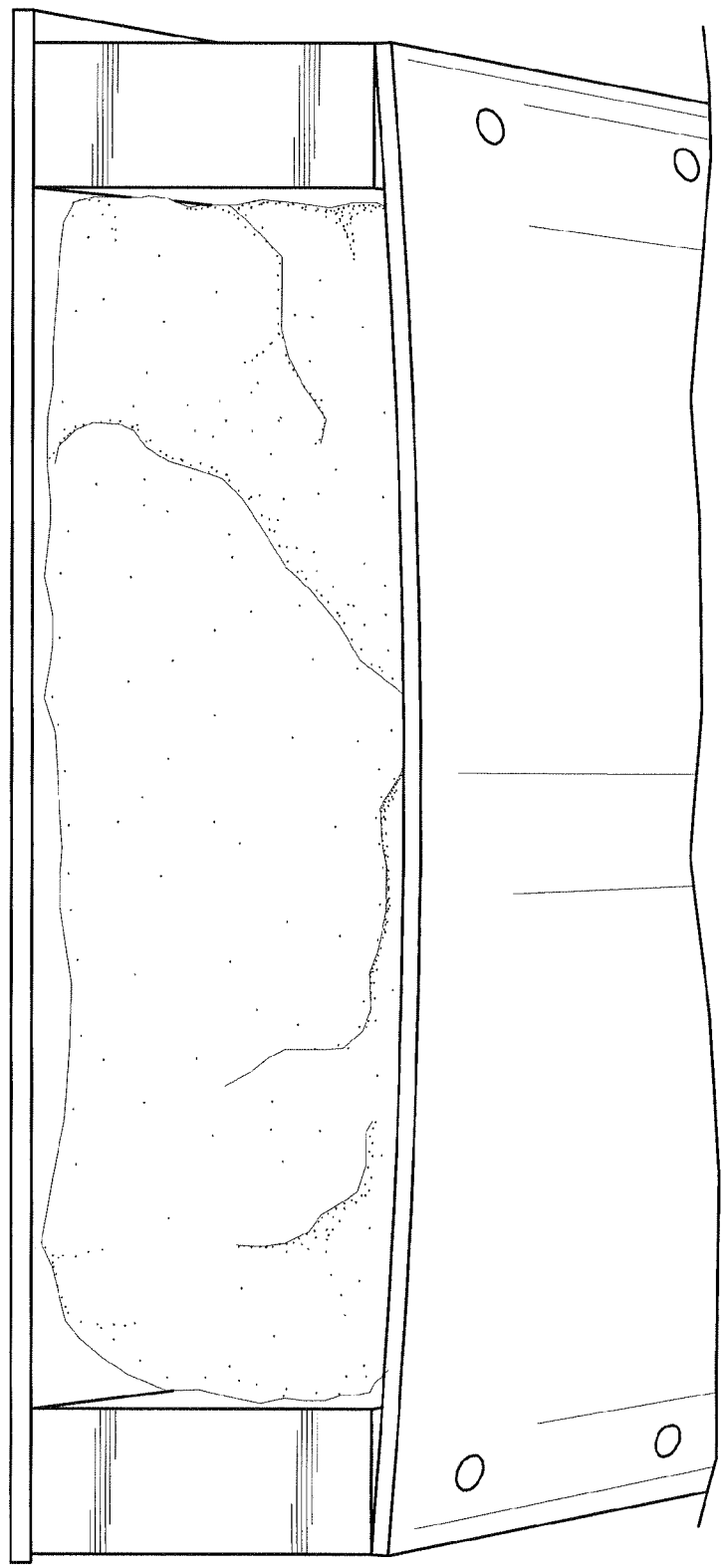
FIG. 10 is a top perspective view of the testing cavity illustrating the bowing of the walls of the testing unit when blowing agents other than HFC-245fa or FEA-1100 were used, simulative of what occurs using high pressure impingement foaming.
Figure 11:
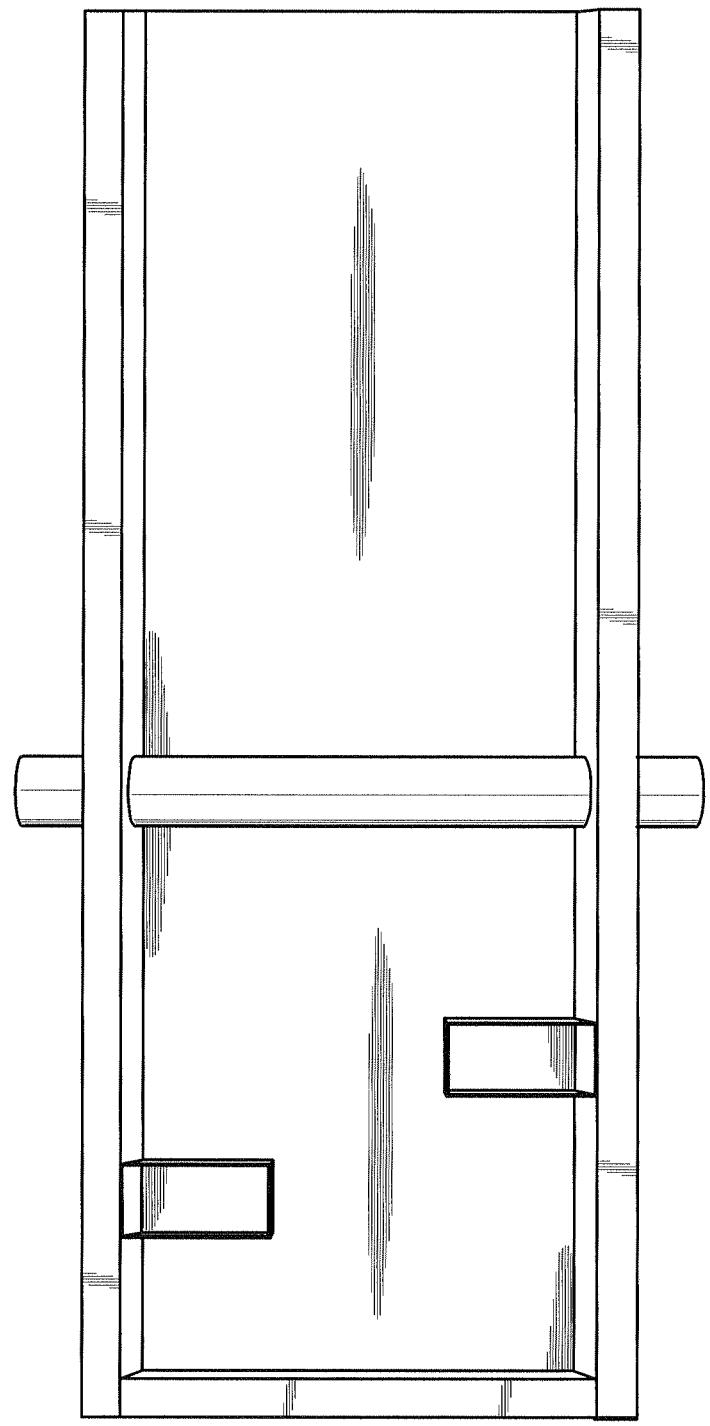
FIG. 11 is a is a front elevational view of the testing apparatus illustrating an obstruction positioned about midway through the cavity and a pair of junction boxes positioned toward a lower end of the testing apparatus.
Figure 12:
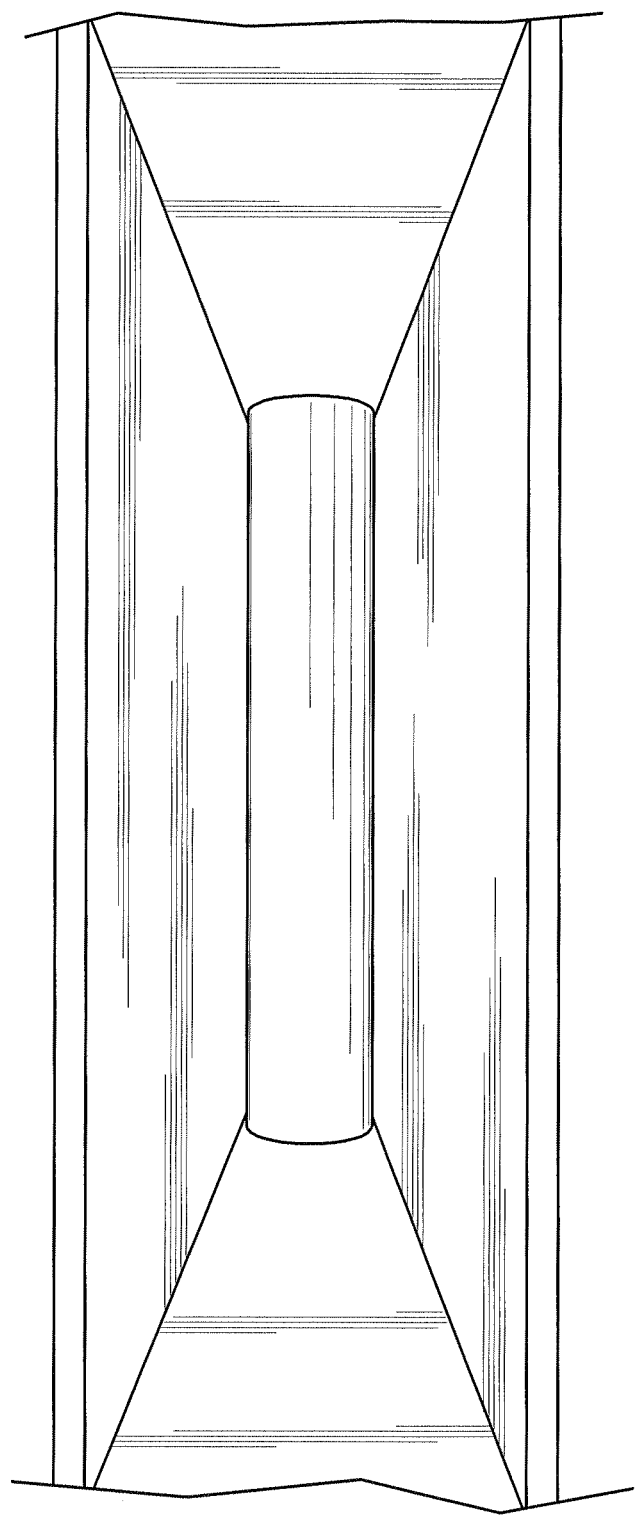
FIG. 12 is a top view of the testing apparatus illustrating the narrow gap on opposed sides of the middle obstruction.
Figure 13:
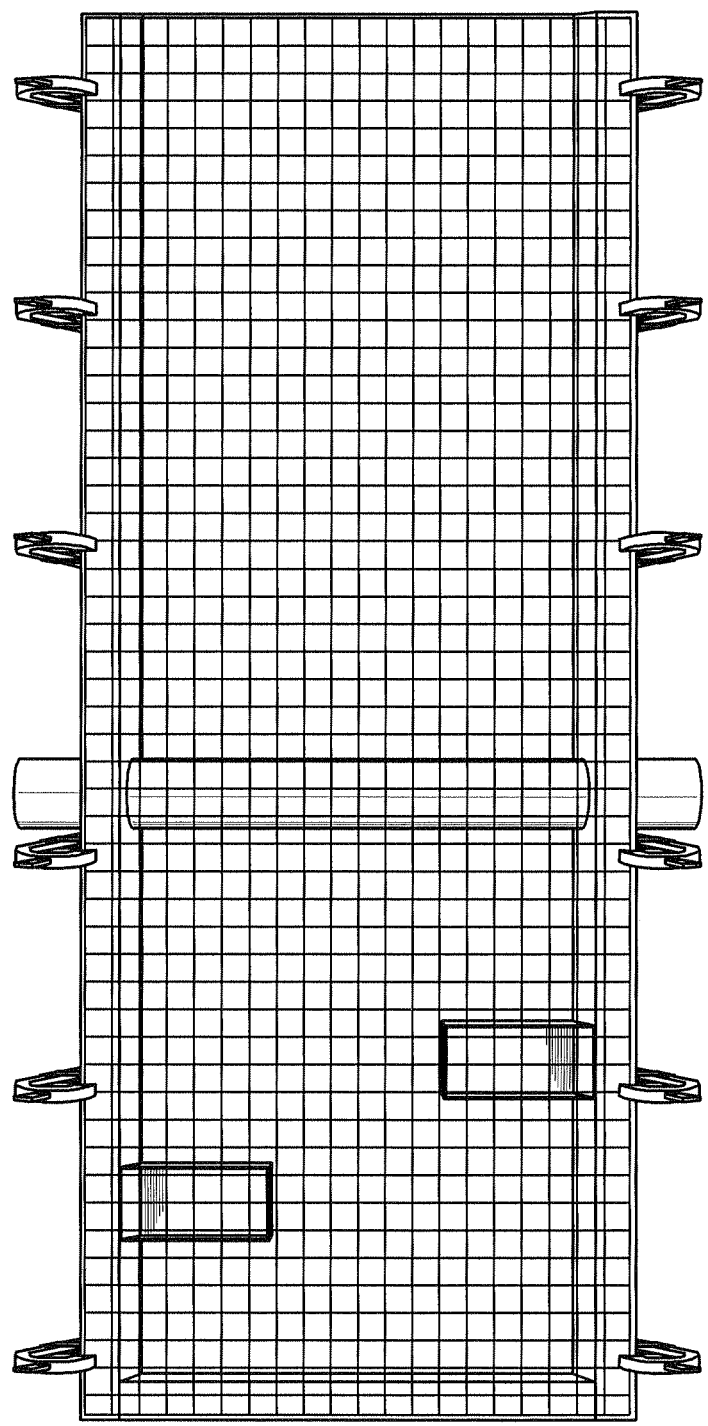
FIG. 13 is a front elevational view of the testing apparatus with plexiglass affixed to the front of the cavity.

FIG. 11 illustrates the testing equipment used in experiments 1-9. The test cavity was designed to simulate a hollow wall space as would be seen in many homes of early construction when fiberglass batting was not used prevalently. The cavity was designed with a 2.5 inch (6.35 cm) O.D. polyvinyl chloride pipe positioned through the approximate middle of the cavity of dimensions: depth 3.5 inches×width 16.75 inches×height 46 inches (equivalently depth 8.9 cm×width 42.55 cm×height 116.8 cm), and two electrical junction boxes (dimensions: 3.25×8×4 inches, equivalently 8.26×20.3×10.2 cm) positioned at 4.5 and 13 inches (equivalently 11.4 and 33 cm) below the PVC pipe. Retrofitting a typical 3.5"×14.5"×8' (equivalently 8.9 cm×36.8 cm×243.8 cm) cavity with insulation is difficult, and often results in either incomplete filling (e.g., cellulose-based solutions) or in cracked drywalls (when high pressure impingement foaming is employed). Traditional solutions have often employed higher pressure, further exacerbating the drywall cracking issue, but seeking to achieve more penetration through tight spaces, as may be created by house wiring positioned within the cavities. FIG. 12 illustrates just how narrow a gap exists between the interior and exterior walls of the cavity vis-à-vis the inserted PVC pipe and electrical boxes, illustrative of electrical conduit or house plumbing. FIG. 13 shows a plexiglass interior wall with grid marks affixed so as to enable a rough estimation of the percentage of fill and FIG. 10 illustrates the "bowing" from a plane between the two sides of the cavity.

Contrary to this more conventional wisdom, the technology described in this application uses low pressure blowing agents and froth polyurethane or froth polyisocyanurate foams.

Figure 2:
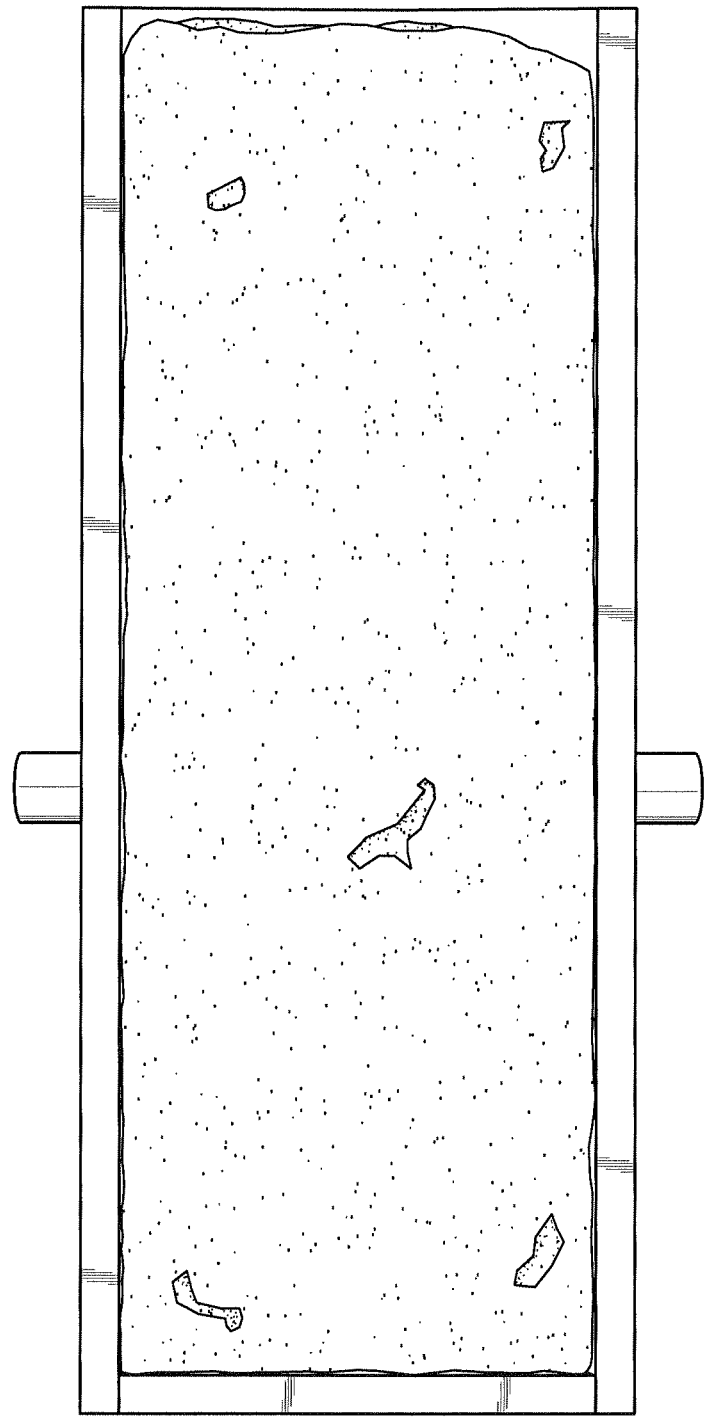
FIG. 2 is a view similar to FIG. 1 of the result of foaming the closed cell polyisocyanurate polymer of Example #2 into a cavity using HFC-245fa as the blowing agent.

As illustrated in the Figures, the use of a low pressure blowing agent, e.g., HFC-245fa and FEA-1100, although other blowing agents with similar physical properties, e.g., HFC-365mfc, HBA-2, AFA-L1, AFA-L2 are anticipated to be effective in this invention, including miscible blends and azeotropes thereof, were successful in combination with a frothable foam, in completely filling the testing cavity. Direct comparisons of a slow rise closed cell polyisocyanurate foam are illustrated in FIGS. 1 & 2, in which the only change between the formulations resides in the composition of the blowing agent, neat HFC-134a in FIG. 1 and neat HFC-245fa in FIG. 2. It is noted that there is no bowing seen in the foamed polyisocyanurate polymers when HFC-245fa was used in the bowing agent, in comparison to the same composition using HFC-134a. The same is demonstrated by the cavity fill formulations shown in FIGS. 3 & 4.

Figure 3:
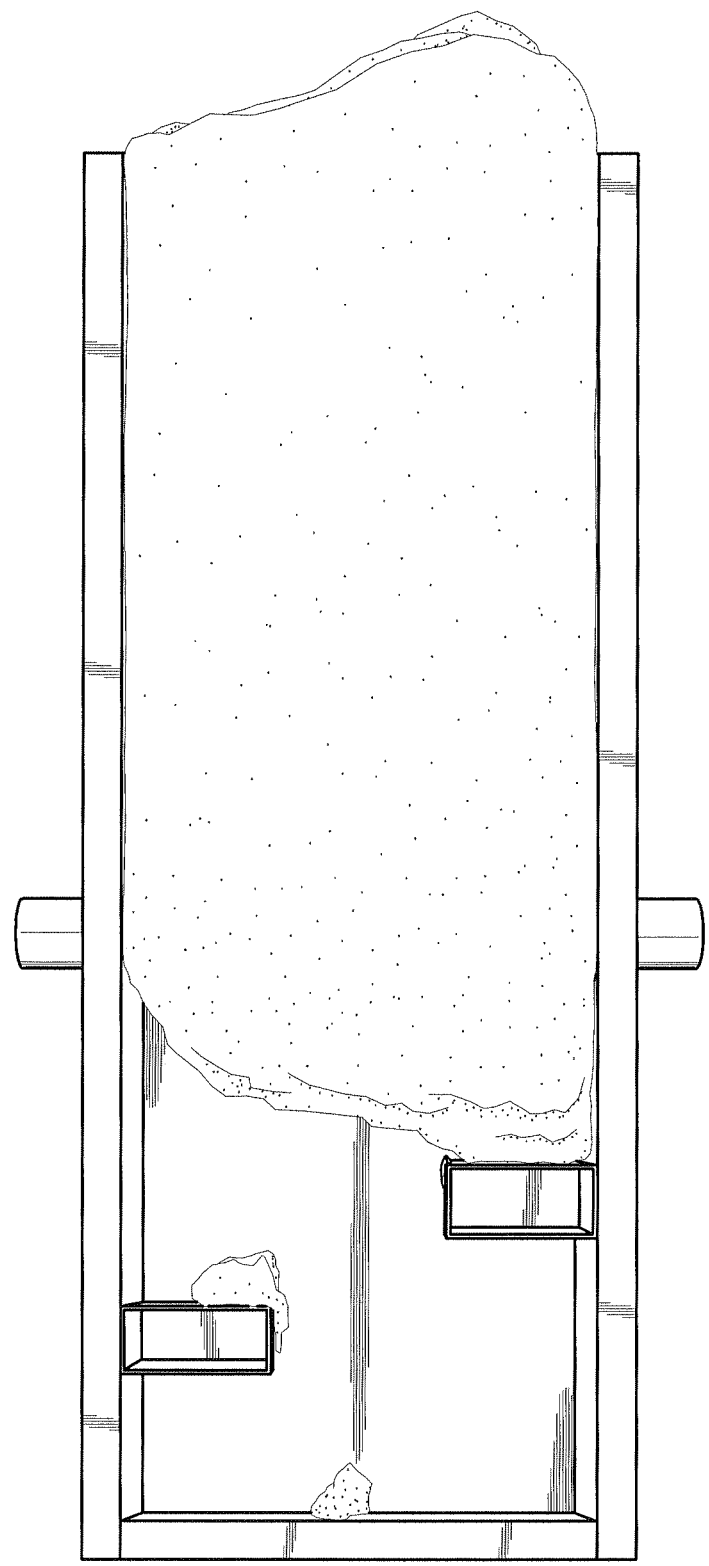
FIG. 3 is a front elevational view of the result of foaming the closed cell polyurethane polymer of Example #3 into a cavity using HFC-134a as the blowing agent.
Figure 4:
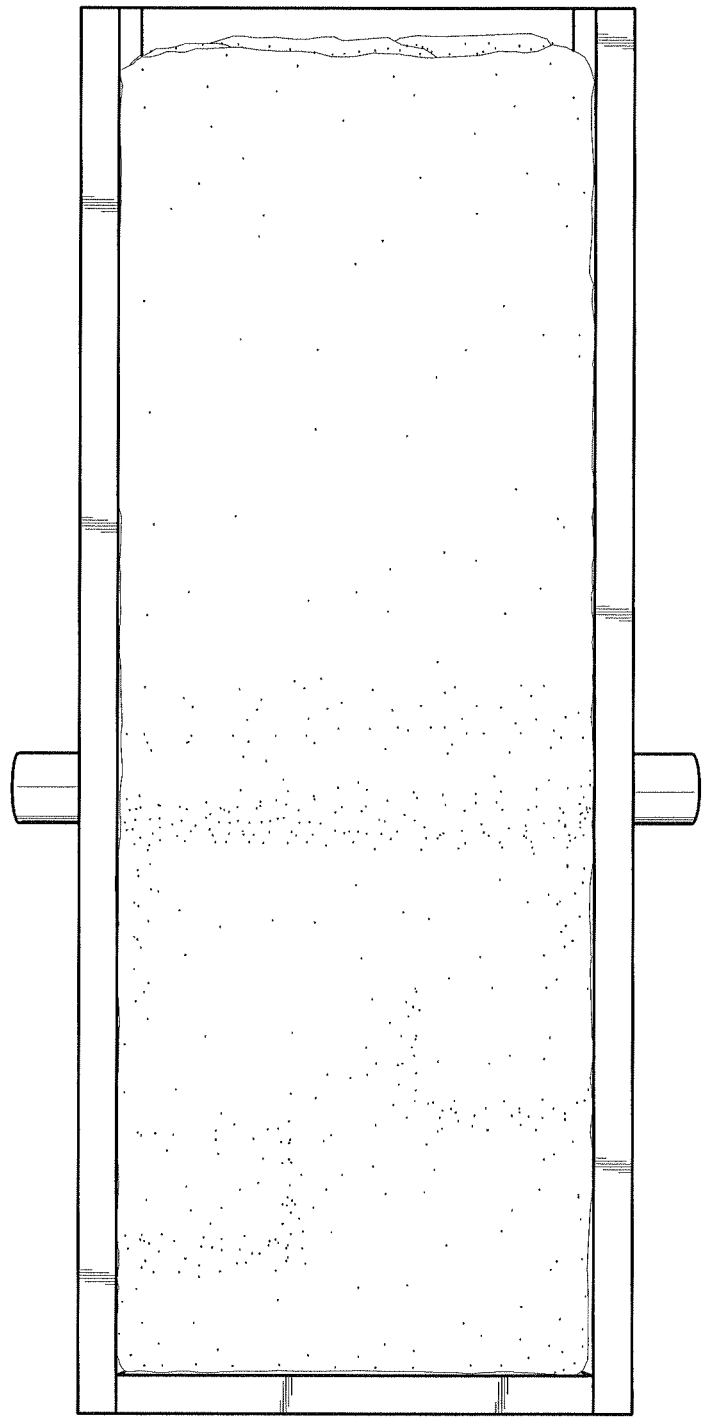
FIG. 4 is a view similar to FIG. 3 of the result of foaming the closed cell polyurethane polymer of Example #4 into a cavity using HFC-245fa as the blowing agent.
Figure 5:
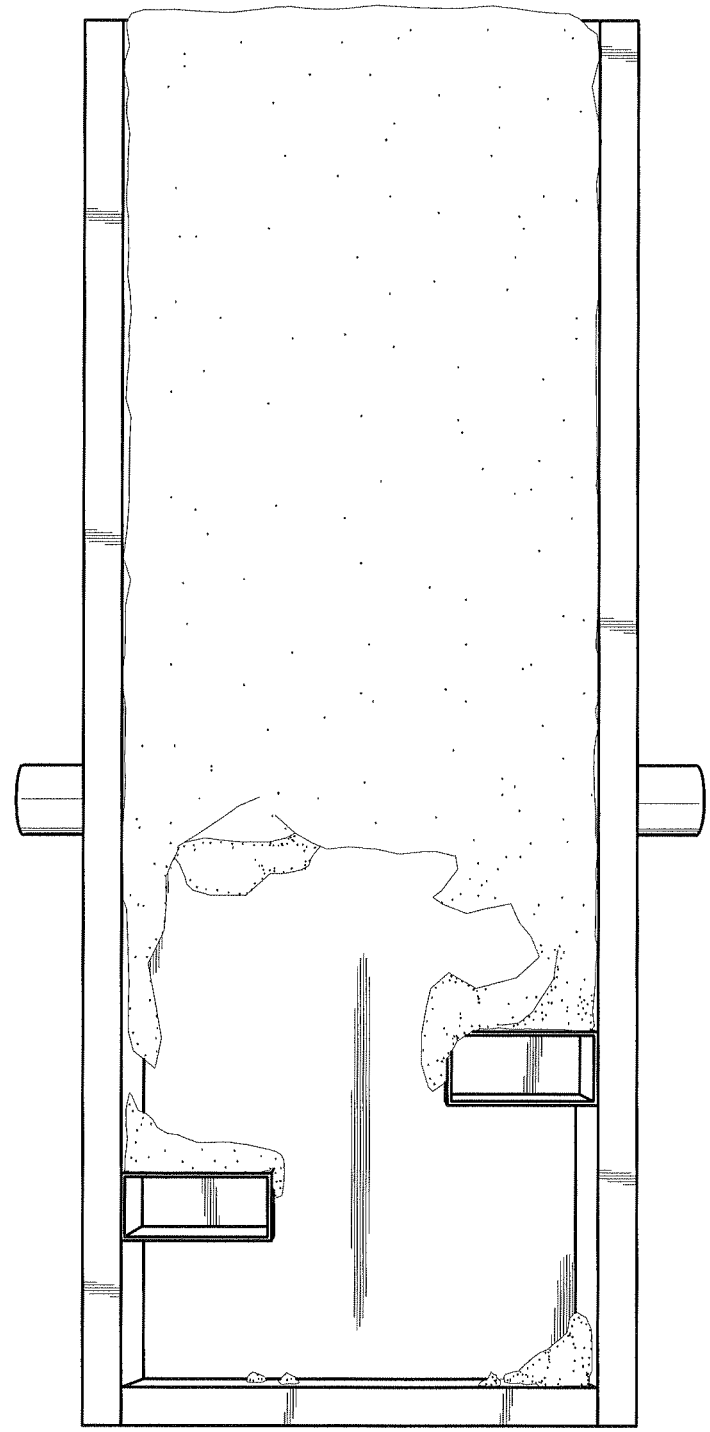
FIG. 5 is a front elevational view of the result of foaming the open-cell polyurethane polymer of Example #5 into a cavity using HFC-134a as the blowing agent.
Figure 6:
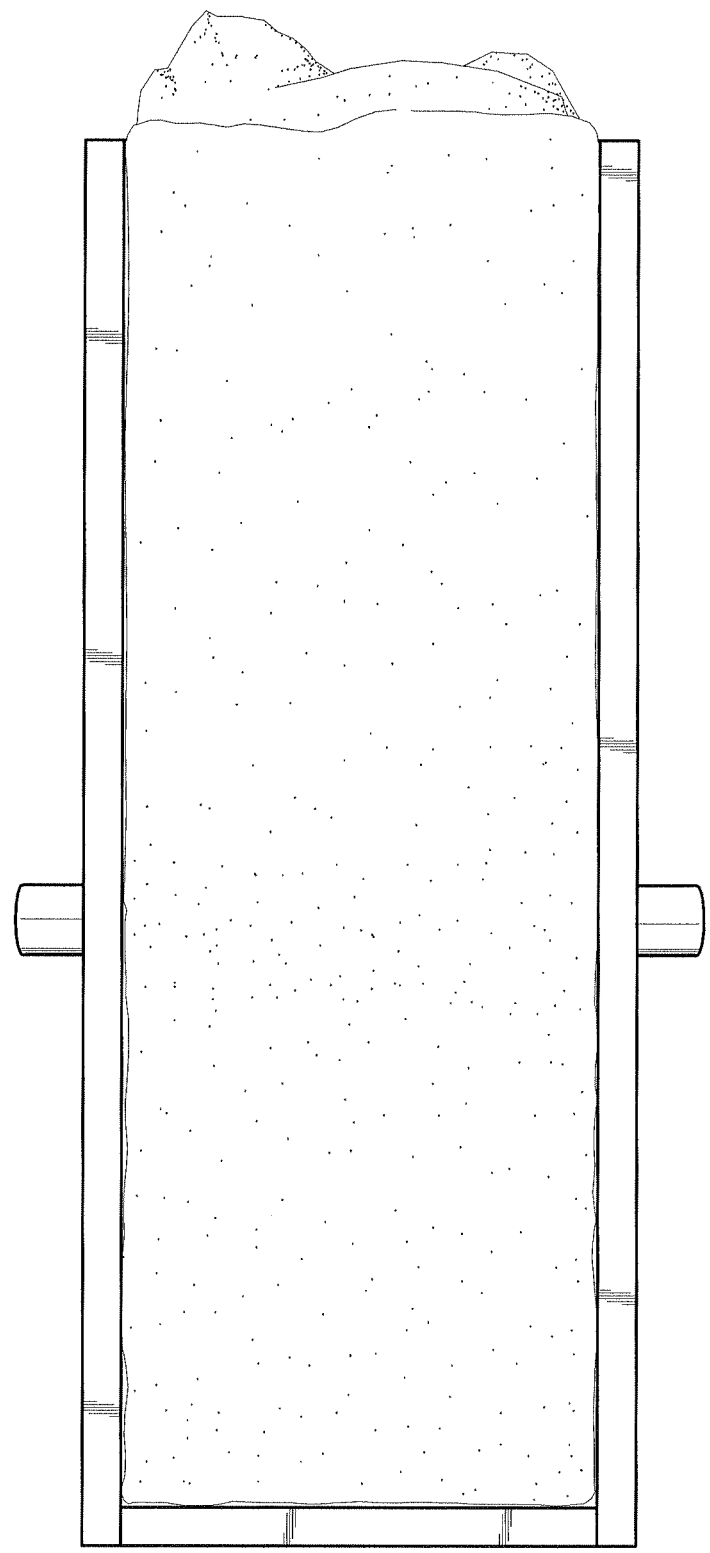
FIG. 6 is a view similar to FIG. 5 of the result of foaming the open-cell polyurethane polymer of Example #6 into a cavity using HFC-245fa as the blowing agent.
Figure 7:
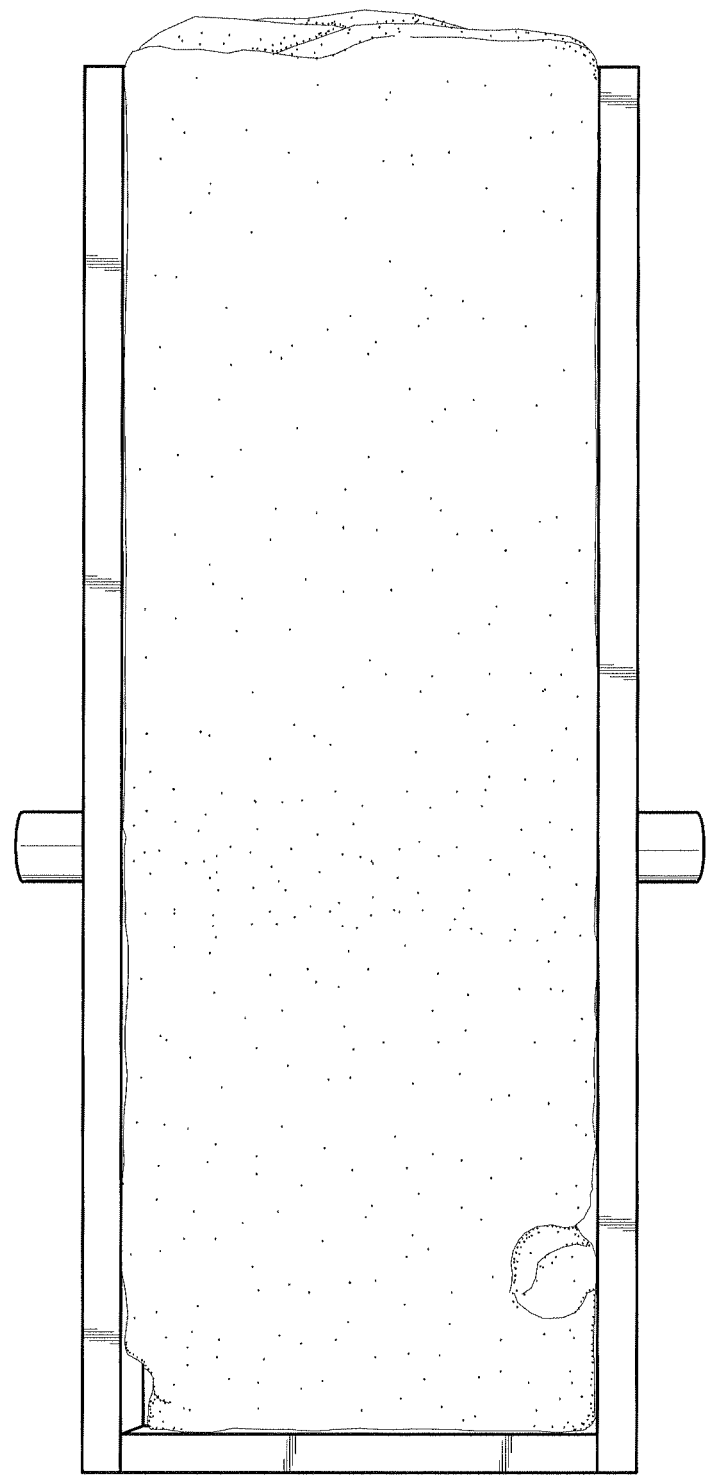
FIG. 7 is a view similar to FIGS. 5 & 6 of the result of foaming the open-cell polyurethane polymer of Example #7 into a cavity using FEA-1100 as the blowing agent.
Figure 8:
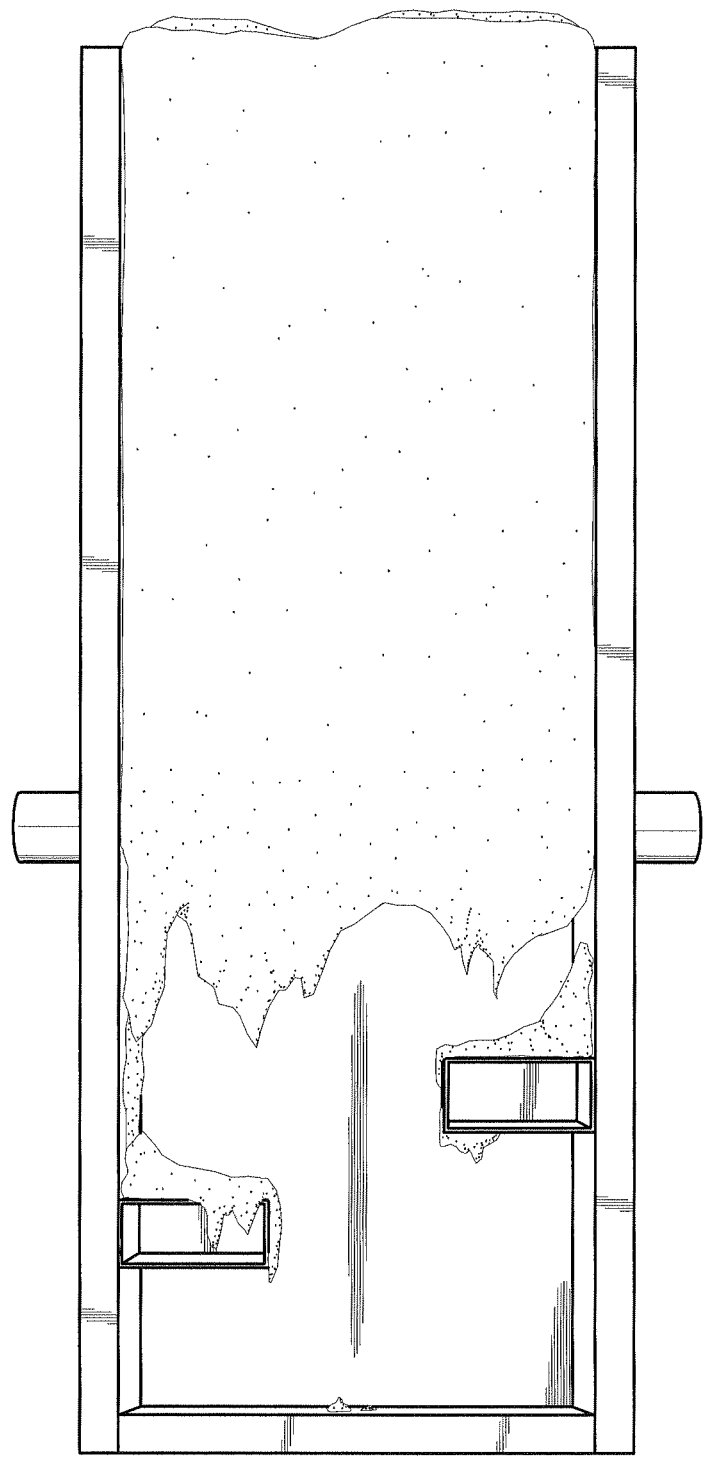
FIG. 8 is a front elevational view of the result of foaming the closed cell polyisocyanurate polymer of Example #8 into a cavity using HFC-134a as the blowing agent.
Figure 9:
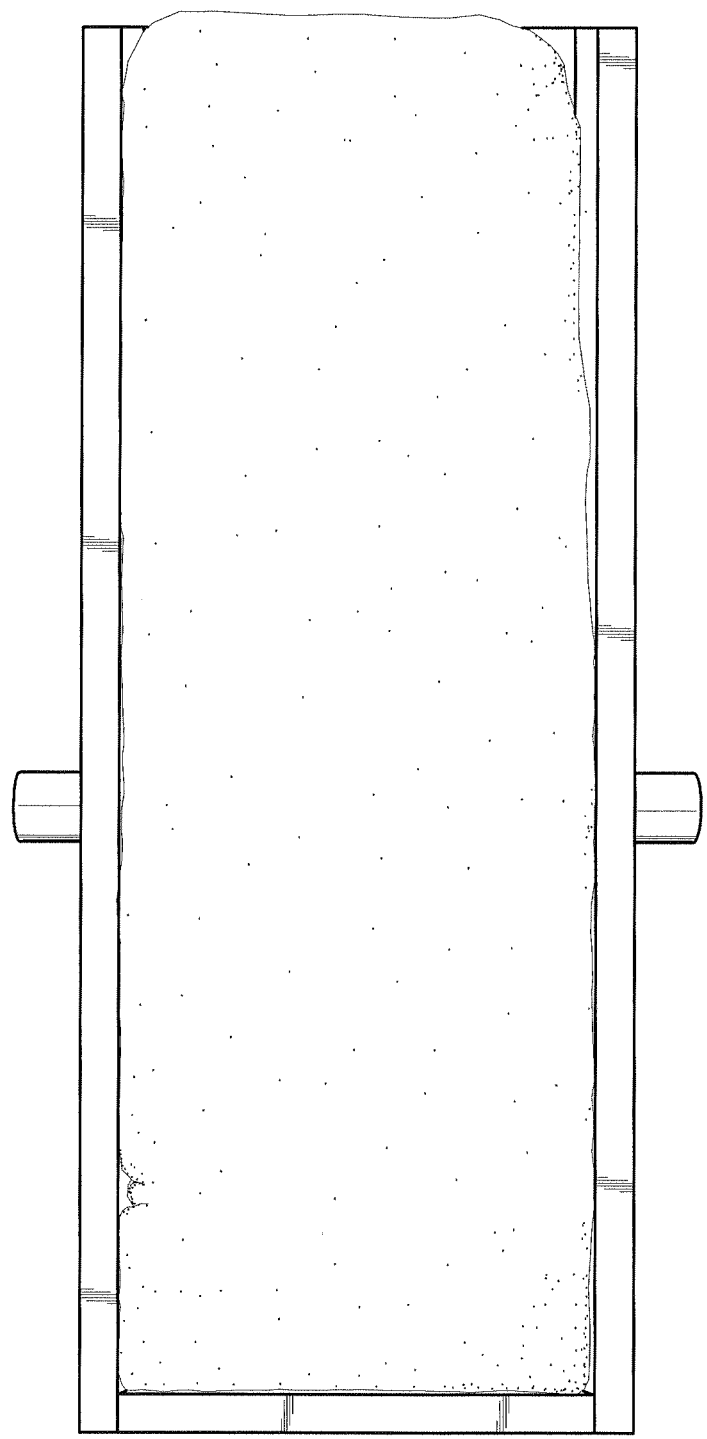
FIG. 9 is a view similar to FIG. 8 of the result of foaming the closed cell polyisocyanurate polymer of Example #9 into a cavity using HFC-245fa as the blowing agent.

FIGS. 3 & 4 illustrate this similar distinction when using a closed cell cavity fill polyurethane foam with similar lack of bowing when HFC-245fa was used as the blowing agent. As shown in FIGS. 5 through 7 for an open-celled sound barrier polyurethane foam, while no bowing issues were observed for any of the polymers, the ability of the foams to secure passage through tight spaces was clearly illustrated to be of paramount importance when HFC-134a was used. This issue however, was not present when either HFC-245fa or FEA-1100 were used as the blowing agent. FIGS. 8 & 9 illustrate the same phenomenon for a quick cure closed foam polyisocyanurate foam similar to that previously discussed with reference to FIGS. 1 through 4.

This invention is applicable to either PIR or PUR foamed polymers, and in one embodiment, is directed toward the application of the froth foams prepared therefrom to insulate into the exterior wall cavities, although it should be understood that the invention is not limited to exterior wall cavities, but rather any cavity which is desired to be filled with a foamed material, typically requires only one filling hole, preferably at the top of the cavity. This results in labor costs over the use of multiple holes. By employing at least one low pressure blowing agent, the foam flows evenly around obstacles (e.g., pipes, cross members, electrical boxes) leaving minimal or no voids. The foam is of uniform density from the top to the bottom of the cavity, with minimal to no densification.

The use of a froth foam minimizes or prevents seepage of the foam prepolymer at the bottom of the wall cavity. The foam is typically dispensed from cylinders and is pre-expanded with a low vapor pressure HFC blowing agent, preferably 245fa (1,1,1,3,3 pentafluoropentane) as well as FEA-1100, HFC-365mfc, HBA-2, AFA-L1, AFA-L2, including miscible blends and azeotropes thereof. The foam is dispensed through a static mixer which ensures that the "A" and "B" sides react and polymerize sufficiently upon dispensing to create sufficient molecular weight build and thus "froth".

This application utilizes a low pressure blowing agent in a decidedly new manner. Polyurethane froth foam is traditionally blown with a high vapor pressure blowing agent, i.e., HFC-134a (1,1,1,2 tetrafluoroethane) which has a vapor pressure of 82 psig at 25° C., to ensure dispensing all of the cylinder's contents. It was counterintuitive that using a high percentage of a low vapor pressure foam, such as HFC-245fa (1,1,1,3,3 pentafluoropentane) having a vapor pressure of 17.8 psig at 20° C. would dispense properly from pressurized cylinders.

The application uses HFC-245fa, FEA-1100, HFC-365mfc, HBA-2, AFA-L1, AFA-L2, including miscible blends and azeotropes thereof, in an effective amount as a blowing agent component, with some nitrogen to top off the froth foam cylinders to better enable complete dispensing achieves mold cavity filling characteristics which are not traditionally experienced with high pressure impingement foaming applications. The application may optionally employ a co-blowing agent, e.g., water, to reduce the density of the foam and to help open cells (thereby relieving pressure) during cure via the formation of polyurea segments. It is believed that the combination of water with methylene diphenyldiisocyanate form polyurea structures, which disrupt cell formation, thereby assisting in achieving a high open cell content. The blowing agent can be a blend of blowing agents or an azeotrope thereof. When used as a blend, an effective amount of a blowing agent having the characteristics of higher boiling point and lower vapor pressure is required.

In one aspect of the invention, the conclusion that it was possible to substitute a higher boiling point blowing agent at a 1:1 substitution level for a lower boiling point blowing agent, is quite surprising. Without being held to any one theory of operation, the use of nitrogen-pressurized cylinders (other non-reactive gases could be employed) is believed to be at least one aspect of this invention. What is equally counterintuitive is the recognition that the cure profile for a low vapor pressure blowing agent foam system and the cure profile for a higher vapor pressure blowing agent foam system could be essentially similar, yet effective. In comparative testing using identical polyurethane composition foams, the following reaction profiles were obtained for the gel and tack times for the three systems using a non-aged system. As illustrated below, the initial reaction profile testing of the high vapor pressure blowing agent HFC-134a was very similar to the results obtained with the lower vapor pressure blowing agents HFC-245fa and FEA-1100. The fact that the reaction profiles would be similar, yet significantly different results achieved, in terms of foam filling was completely counterintuitive. Conventional wisdom would have suggested that values in the range of 180 seconds or more would be required. However, these results are anticipated to be achievable when the formulations of the invention have gel times of approximately 90 seconds or less, more preferably 60 seconds or less, and most preferably, 45 seconds or less.

| Blowing Agent | Gel (sec) | Tack (sec) | V.P. @ 20° C. | V.P. @ 50° C. |
|---|---|---|---|---|
| HFC-134a | 27 | 37 | ~570 kPa | ~1320 kPa |
| HFC-245fa | 19 | 36 | ~123 kPa | ~389 kPa |
| FEA-1100 | 22 | 28 | ~69 kPa | ~172 kPa |

The foam of the invention dispenses from relatively inexpensive pressurized, but considered low-pressure (130-225 psi) cylinders rather than high pressure dispensing equipment (>1,000 psi as typically used in impingement mixing) of the prior art. The use of cylinder dispensed polyurethane foam does not have upfront capital costs for equipment as would be necessary with high pressure dispensed polyurethane foam, which is in the order of $30,000 to $100,000 for the special handling equipment required, including proportioning units and spray guns.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process for filling a cavity to provide an air barrier and insulate within said cavity with a frothable polyurethane or a polyisocyanurate foam system without bowing an interior wall of said cavity or seep from cracks at a bottom of said space prior to foaming, said process comprising the step of:
adding a two-component polyurethane or polyisocyanurate foam to said cavity, said foam comprising an effective amount of at least one non-flammable blowing agent, and wherein more than one blowing agent is used, each of said blowing agents are non-flammable, including only non-flammable miscible blends and only non-flammable azeotropes thereof, said blowing agents comprising formula (I):

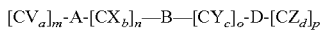

wherein
C is a carbon atom;
V, X, Y and Z are independently selected from the group consisting of H, F and Cl;
a & d are independently selected from the integral values ranging from 0 to 3 inclusive;
b & c are independently selected from the integral values ranging from 0 to 2 inclusive;
o, p & n are equal to 1;
m is selected from the integral values ranging from 0 to 1 inclusive;
A, B and D are covalent bonds sufficient to satisfy the available bonding sites of adjacent carbon atoms, if such carbon atoms are present;
each of said blowing agents and non-flammable miscible blends and non-flammable azeotropes having a boiling point between approximately 5-50° C., and an ozone depletion potential of not greater than 0.05;
said foam system having a reaction profile gel and tack time which is less than approximately 90 seconds.

2. The process of claim 1 wherein
said covalent bonds A, B and D are independently selected from the group consisting of single, double and triple covalent bonds.

3. The process of claim 1 wherein formula (I) is selected from the group consisting of
HFC-245fa, HFC-365mfc, HBA-2, FEA-1100, AFA-L1, AFA-L2, non-flammable miscible blends having a boiling point between approximately 5-50° C., and an ozone depletion potential of not greater than 0.05 and non-flammable azeotropes having a boiling point between approximately 5-50° C., and an ozone depletion potential of not greater than 0.05 thereof and further wherein formula (I) is a major amount of said blowing agent.

4. The process of claim 3 wherein said blowing agent has a boiling point between approximately 10-40° C.

5. The process of claim 4 wherein
said reaction profile gel and tack time is less than approximately 60 seconds.

6. The process of claim 5 wherein
said reaction profile gel and tack time is less than approximately 45 seconds.

7. The process of claim 6 wherein said polyol component comprises
a halogenated aromatic polyol.

8. The process of claim 7 wherein said polyol component further comprises
a sucrose polyether polyol with a functionality of at least 4.

9. The process of claim 8 wherein said polyol component further comprises
at least three different catalysts.

10. The process of claim 9 wherein a vapor pressure of said blowing agent is
approximately 5 psi (34.5 kPa) to 30 psi (206.9 kPa) at 75° F. (24° C.).

11. A process for filling a cavity to provide an air barrier and insulate within said cavity with a frothable polyurethane or a polyisocyanurate foam system without bowing an interior wall of said cavity or seep from cracks at a bottom of said space prior to foaming, said process comprising the step of:
adding a two-component polyurethane or polyisocyanurate foam to said cavity, said foam comprising an effective amount of at least one non-flammable blowing agent, and wherein more than one blowing agent is used, each of said blowing agents are non-flammable, including only non-flammable miscible blends and only non-flammable azeotropes thereof, said blowing agents comprising formula (II):

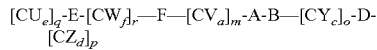

wherein

C is a carbon atom;

U, W, V, X, Y and Z are independently selected from the group consisting of H, F and Cl;

d & e are independently selected from the integral values ranging from 0 to 3 inclusive;

a, b, c & f are independently selected from the integral values ranging from 0 to 2 inclusive;

o, p & n are equal to 1;

m, q & r are independently selected from the integral values ranging from 0 to 1 inclusive;

A, B, D, E and F are covalent bonds sufficient to satisfy the available bonding sites of adjacent carbon atoms, if such carbon atoms are present;

each of said blowing agents, miscible blends of said blowing agents and azeotropes of said blowing agents having a boiling point between approximately 5-50° C., and an ozone depletion potential of not greater than 0.05;

said foam system having a reaction profile gel and tack time which is less than approximately 90 seconds;

each of said blowing agents, miscible blends of said blowing agents and azeotropes of said blowing agents being non-flammable.

12. The process of claim 11 wherein
said covalent bonds A, B, D, E and F are independently selected from the group consisting of single, double and triple covalent bonds.

13. The process of claim 11 wherein formula (II) is selected from the group consisting of
HFC-245fa, HBA-2, FEA-1100, AFA-L1, AFA-L2, non-flammable miscible blends having a boiling point between approximately 5-50° C., and an ozone depletion potential of not greater than 0.05 and non-flammable azeotropes having a boiling point between approximately 5-50° C., and an ozone depletion potential of not greater than 0.05 thereof and further wherein formula (II) is a major amount of said blowing agent.

14. The process of claim 13 wherein said blowing agent has a boiling point between approximately 10-40° C.

15. The process of claim 14 wherein
said reaction profile gel and tack time is less than approximately 60 seconds.

16. The process of claim 15 wherein
said reaction profile gel and tack time is less than approximately 45 seconds.

17. The process of claim 16 wherein said polyol comprises a halogenated aromatic polyol.

18. The process of claim 17 wherein said polyol further comprises
a sucrose polyether polyol with a functionality of at least 4.

19. The process of claim 18 wherein said polyol component further comprises
at least three different catalysts.

20. The process of claim 19 wherein a vapor pressure of said blowing agent is
approximately 5 psi (34.5 kPa) to 30 psi (206.9 kPa) at 75° F. (24° C.).

21. A frothable two-component polyurethane or a polyisocyanurate foam system to provide an air barrier and insulate within a hollow cavity comprising:
an effective amount of at least one non-flammable blowing agent, and wherein more than one blowing agent is used, each of said blowing agents are non-flammable, including only non-flammable miscible blends and non-flammable azeotropes thereof, said blowing agents comprising formula (II):

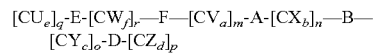

wherein

C is a carbon atom;

U, W, V, X, Y and Z are independently selected from the group consisting of H, F and Cl;

d & e are independently selected from the integral values ranging from 0 to 3 inclusive;

a, b, c & f are independently selected from the integral values ranging from 0 to 2 inclusive;

o, p & n are equal to 1;

m, q & r are independently selected from the integral values ranging from 0 to 1 inclusive;

A, B, D, E and F are covalent bonds sufficient to satisfy the available bonding sites of adjacent carbon atoms, if such carbon atoms are present;

each of said blowing agents, miscible blends of said blowing agents and azeotropes of said blowing agents having a boiling point between approximately 5-50° C., and an ozone depletion potential of not greater than 0.05;

each of said blowing agent, miscible blends and azeotropes thereof being non-flammable;

an isocyanate;

a halogenated aromatic polyol;

a sucrose polyether polyol with a functionality of at least 4; and at least three different catalysts.

22. The foam system of claim 21 wherein
said at least three different catalysts comprise two amine-based catalysts and one tin-based catalyst.

23. A frothable two-component polyurethane or a polyisocyanurate foam system to provide an air barrier and insulate within a cavity comprising:
an effective amount of at least one non-flammable blowing agent, and wherein more than one blowing agent is used, each of said blowing agents are non-flammable, having a boiling point between approximately 5-50° C., and an ozone depletion potential of not greater than 0.05, said blowing agent consisting essentially of 1,1,1,3,3-pentafluoropropane;

an isocyanate;

a halogenated aromatic polyol;

a sucrose polyether polyol with a functionality of at least 4; and at least three different catalysts.

24. The foam system of claim 23 wherein
said at least three different catalysts comprise two amine-based catalysts and one tin-based catalyst.

25. The foam system of claim 23 which further comprises at least one second non-flammable co-blowing agent, said at least one second co-blowing agent having a boiling point between approximately 5-50° C., and an ozone depletion potential of not greater than 0.05, including non-flammable blends and non-flammable azeotropes of said at least one second non-flammable co-blowing agent.

26. The foam system of claim 25 wherein
said at least one second non-flammable co-blowing agent is selected from the group consisting of FEA-1100, AFA-L1, AFA-L2 and HBA-2, including non-flammable blends and non-flammable azeotropes of said at least one second non-flammable co-blowing agent.

27. A process for filling a cavity with a frothable polyurethane or a polyisocyanurate foam system to provide an air barrier and insulate within said cavity without bowing an interior wall of said cavity or seep from cracks at a bottom of said space prior to foaming, said process comprising the step of:
adding a two-component polyurethane or polyisocyanurate foam to said cavity, said foam comprising an effective amount of at least one non-flammable blowing agent, and wherein more than one blowing agent is used, each of said blowing agents are non-flammable, including only non-flammable miscible blends and only non-flammable azeotropes thereof, said blowing agent having a boiling point between approximately 5-50° C., and an ozone depletion potential of not greater than 0.05, said blowing agent consisting essentially of 1,1,1,3,3-pentafluoropropane.

28. The process of claim 27 wherein said step of adding further includes at least one second non-flammable co-blowing agent selected from the group consisting of HFC-365mfc, HBA-2, FEA-1100, AFA-L1, AFA-L2, non-flammable miscible blends having a boiling point between approximately 5-50° C. and an ozone depletion potential of not greater than 0.05 and non-flammable azeotropes having a boiling point between approximately 5-50° C. and an ozone depletion potential of not greater than 0.05.

29. The process of claim 27 wherein said at least one non-flammable blowing agent has
a boiling point between approximately 10-40° C.

30. The process of claim 28 wherein said at least one second non-flammable co-blowing agent has
a boiling point of between approximately 10-40° C.

31. The process of claim 27 wherein
said reaction profile gel and tack time is less than approximately 60 seconds.

32. The process of claim 31 wherein
said reaction profile gel and tack time is less than approximately 45 seconds.

33. The process of claim 27 wherein a vapor pressure of said at least one non-flammable blowing agent is
approximately 5 psi (34.5 kPa) to 30 psi (206.9 kPa) at 75° F. (24° C.).

* * * * *

UNITED STATES PATENT AND TRADEMARK OFFICE
CERTIFICATE OF CORRECTION

PATENT NO. : 8,680,168 B2  
APPLICATION NO. : 13/298751  
DATED : March 25, 2014  
INVENTOR(S) : Fishback et al.

Page 1 of 1

It is certified that error appears in the above-identified patent and that said Letters Patent is hereby corrected as shown below:

In the Claims

Claim 11; Column 25; Line 8:

delete

"$[CU_e]_q - E - [CW_f]_r - F - [CV_a]_m - A - B - [CY_c]_o - D - [CZ_d]_p$"

and insert

--$[CU_e]_q - E - [CW_f]_r - F - [CV_a]_m - A - [CX_b]_n - B - [CY_c]_o - D - [CZ_d]_p$--.

Signed and Sealed this  
Twenty-second Day of July, 2014

Michelle K. Lee  
*Deputy Director of the United States Patent and Trademark Office*